United States Patent [19]
Dames et al.

[11] Patent Number: 5,815,091
[45] Date of Patent: Sep. 29, 1998

[54] POSITION ENCODER

[75] Inventors: Andrew N. Dames, Cambridge; David T. Ely, Harston; Andrew R. L. Howe, Stansted, all of Great Britain

[73] Assignee: Scientific Generics Limited, Cambridgeshire, Great Britain

[21] Appl. No.: 737,505
[22] PCT Filed: May 15, 1995
[86] PCT No.: PCT/GB95/01095
   § 371 Date: Dec. 12, 1996
   § 102(e) Date: Dec. 12, 1996
[87] PCT Pub. No.: WO95/31696
   PCT Pub. Date: Nov. 23, 1995

[30] Foreign Application Priority Data

| May 14, 1994 | [GB] | United Kingdom | 9409711 |
| Aug. 26, 1994 | [GB] | United Kingdom | 9417353 |
| Oct. 3, 1994 | [GB] | United Kingdom | 9420597 |
| Nov. 25, 1994 | [GB] | United Kingdom | 9423861 |

[51] Int. Cl.⁶ .................................................. G08C 21/00
[52] U.S. Cl. ................ 340/870.34; 336/129; 324/207.17
[58] Field of Search ......................... 340/870.34, 870.32; 336/129; 324/207.17

[56] References Cited

U.S. PATENT DOCUMENTS

| 2,145,742 | 1/1939 | Wechsung . | |
| 2,942,212 | 6/1960 | Mynall . | |
| 3,219,956 | 11/1965 | Newell et al. . | |
| 3,297,940 | 1/1967 | Mulligan et al. . | |
| 3,647,963 | 3/1972 | Bailey | 178/19 |
| 3,851,242 | 11/1974 | Ellis | 324/236 |
| 3,898,635 | 8/1975 | Kulterman | 340/870.34 |
| 3,906,436 | 9/1975 | Kurauchi et al. | 340/989 |
| 3,962,663 | 6/1976 | Visser | 336/129 |
| 4,005,396 | 1/1977 | Fujiwara et al. | 340/870.32 |
| 4,092,852 | 6/1978 | Fowler et al. | 73/117.3 |
| 4,156,192 | 5/1979 | Schedrovitsky et al. | 324/207.17 |
| 4,504,832 | 3/1985 | Conte | 340/870.37 |
| 4,507,638 | 3/1985 | Brosh | 336/79 |
| 4,723,446 | 2/1988 | Saito et al. | 73/313 |
| 4,737,698 | 4/1988 | McMullin et al. | 318/653 |
| 4,893,077 | 1/1990 | Auchterlonie | 324/207.17 |
| 4,985,691 | 1/1991 | Pulyer et al. | 336/130 |
| 4,999,461 | 3/1991 | Murakami et al. | 178/19 |
| 5,028,745 | 7/1991 | Yamanami et al. | 178/19 |
| 5,041,785 | 8/1991 | Bogaerts et al. | 324/207.24 |
| 5,188,368 | 2/1993 | Ryan | 273/237 |
| 5,381,091 | 1/1995 | Kobayashi et al. | 340/870.32 |
| 5,434,372 | 7/1995 | Lin | 178/19 |

FOREIGN PATENT DOCUMENTS

| 0159191 | 10/1985 | European Pat. Off. . |
| 0182085 A2 | 5/1986 | European Pat. Off. . |
| 0209513 | 1/1987 | European Pat. Off. . |
| 0552001 A1 | 7/1993 | European Pat. Off. . |
| 0607694 A1 | 7/1994 | European Pat. Off. . |
| 851543 | 10/1957 | United Kingdom . |
| 1122763 | 3/1967 | United Kingdom . |
| 1452132 | 11/1973 | United Kingdom . |
| 2012431 | 7/1979 | United Kingdom . |
| 2021273 | 11/1979 | United Kingdom . |
| 2059593 | 4/1981 | United Kingdom . |
| 2064125 | 6/1981 | United Kingdom . |
| 2074736 | 11/1981 | United Kingdom . |
| 1604824 | 12/1981 | United Kingdom . |
| 2103943 | 3/1983 | United Kingdom . |
| WO 92/12401 | 7/1992 | WIPO . |
| WO 94/25829 | 11/1994 | WIPO . |
| WO 96/03188 | 2/1996 | WIPO . |

*Primary Examiner*—Michael Horabik
*Assistant Examiner*—Albert K. Wong
*Attorney, Agent, or Firm*—Nixon & Vanderhye P.C.

[57] ABSTRACT

In a linear position encoder, a support is provided upon which a pair of phase quadrature windings are mounted. The windings are arranged to have a sinusoidal magnetic sensitivity characteristic along the length of the support. Mounted on a movable element there is a resonant circuit including a coil and capacitor that can magnetically couple with the windings. When the circuit is excited, it induces currents in the windings that are dependent upon the position of the circuit within a period $T_s$ of the windings. An excitation and processing unit is provided to energize the circuit and to process the signals induced in the windings. The encoder may in a variation, measure rotational or radial position instead of translation.

53 Claims, 28 Drawing Sheets

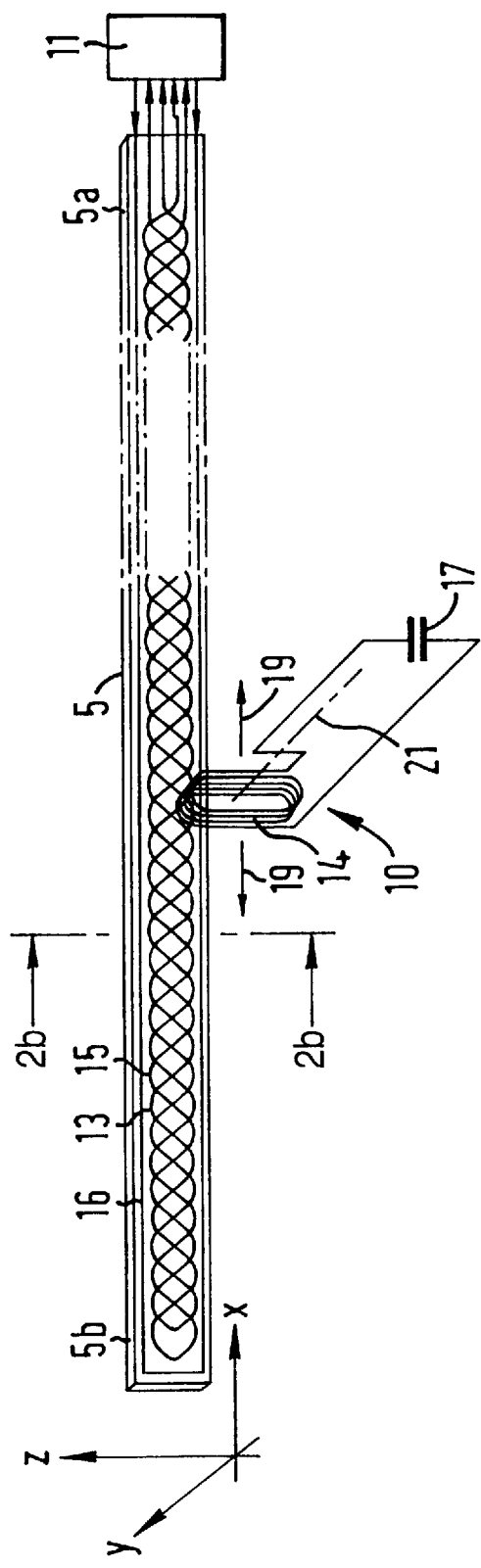
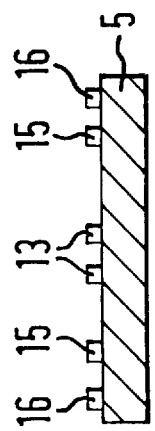
FIG. 2a
FIG. 2b

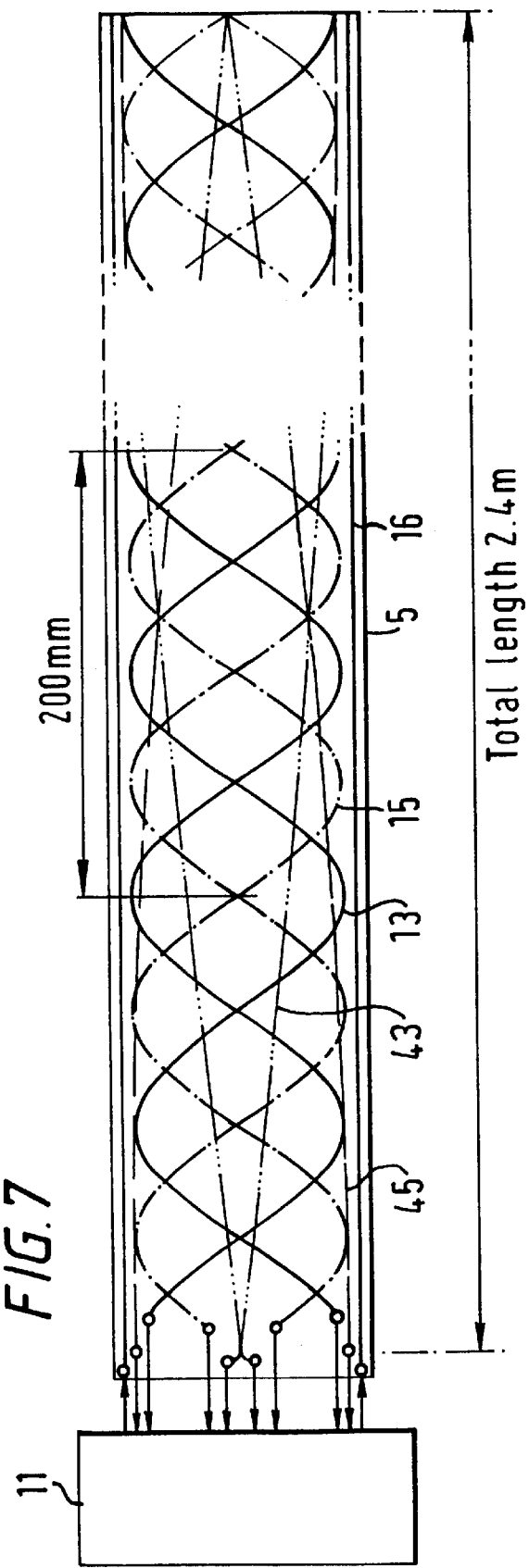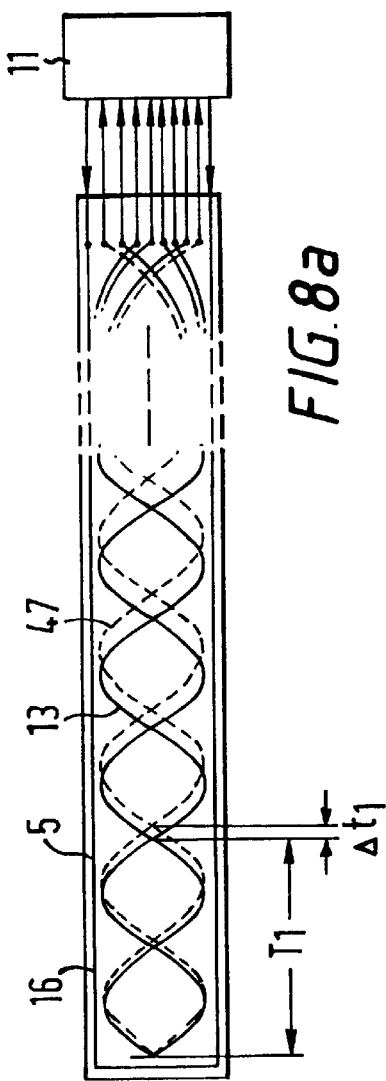

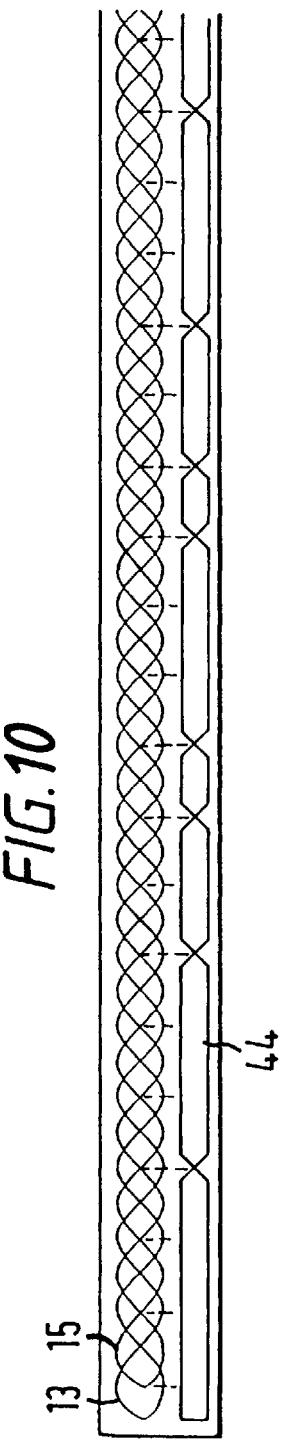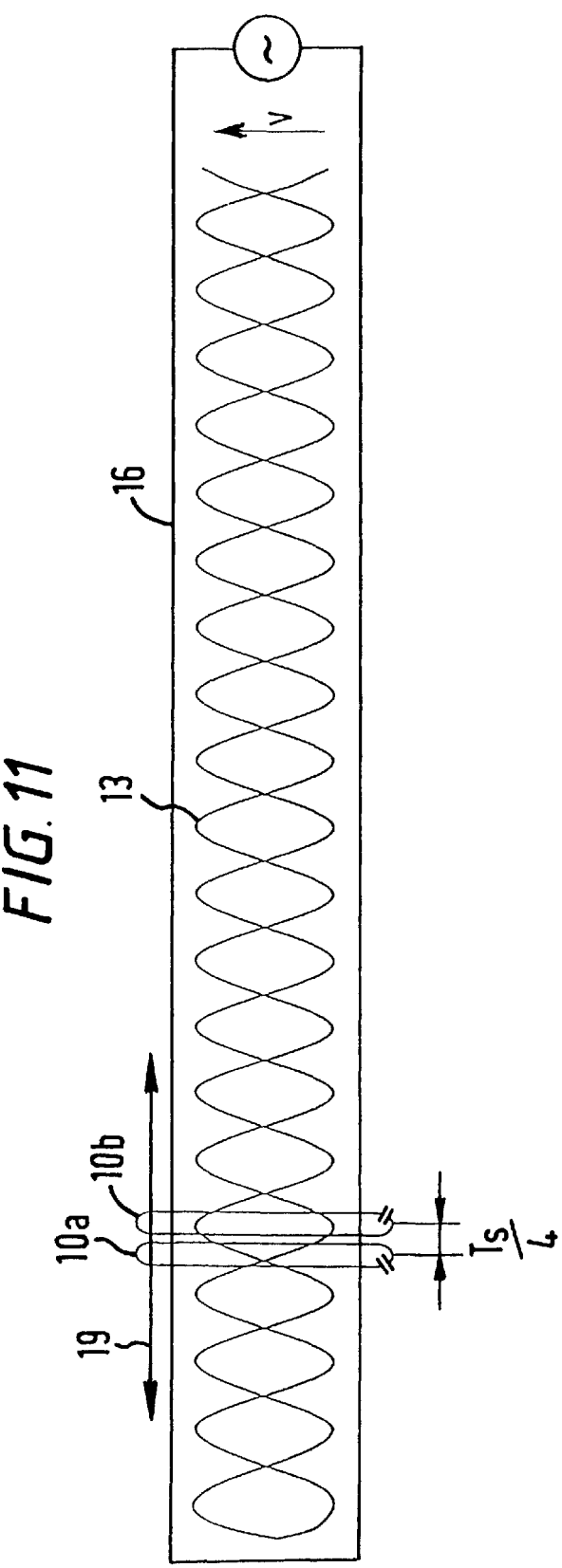

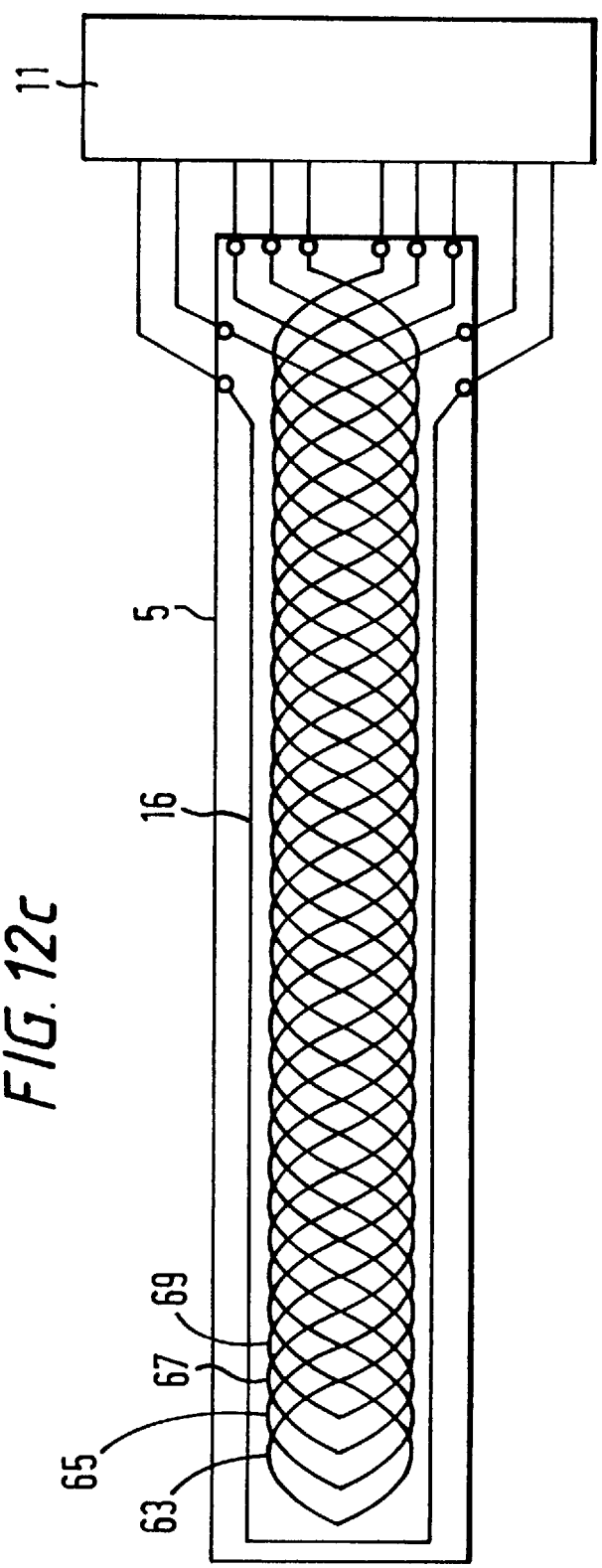

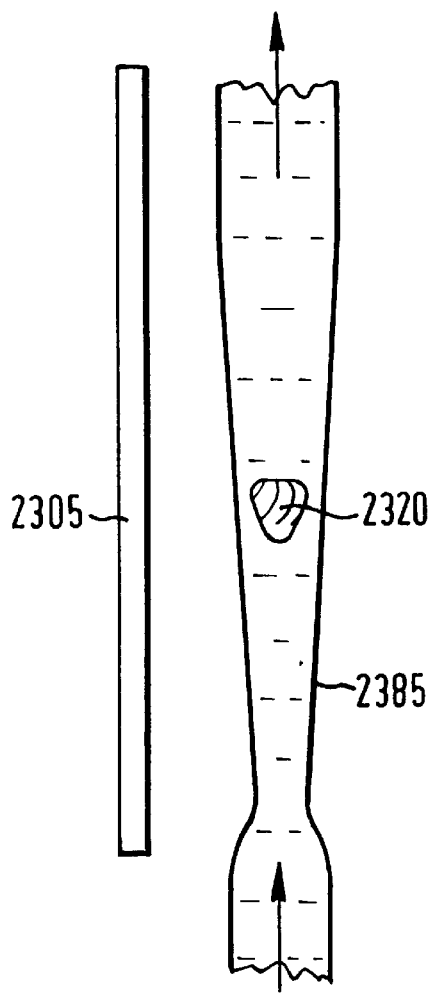
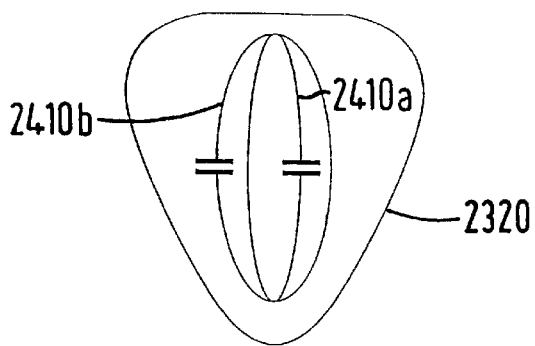
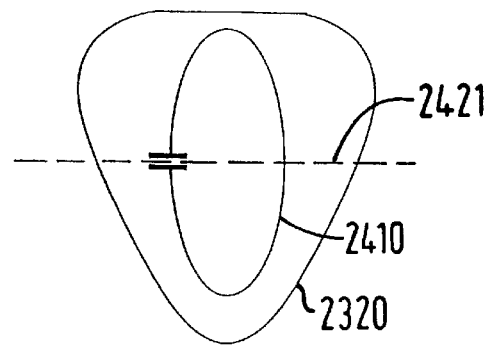
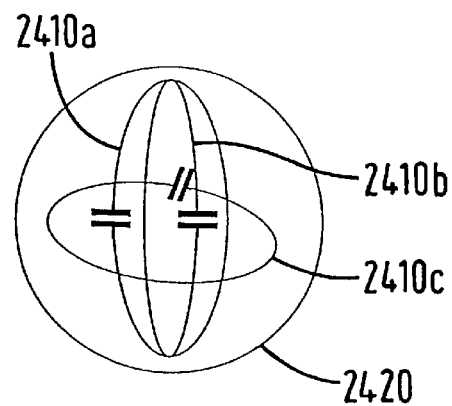
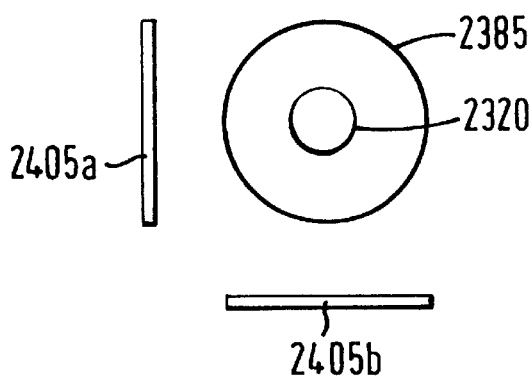

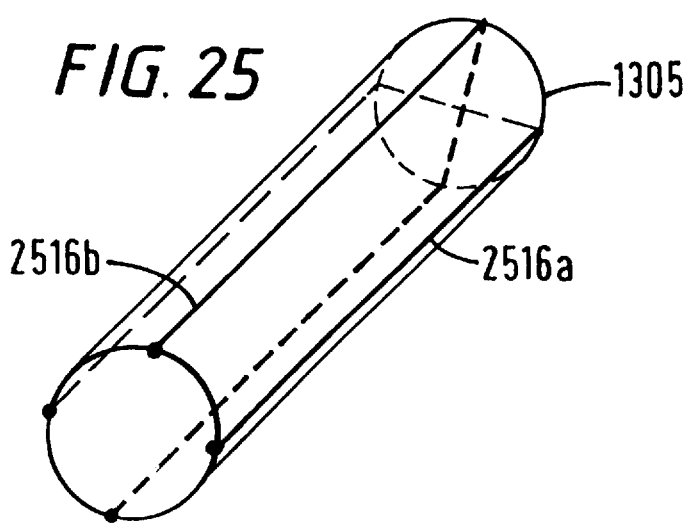

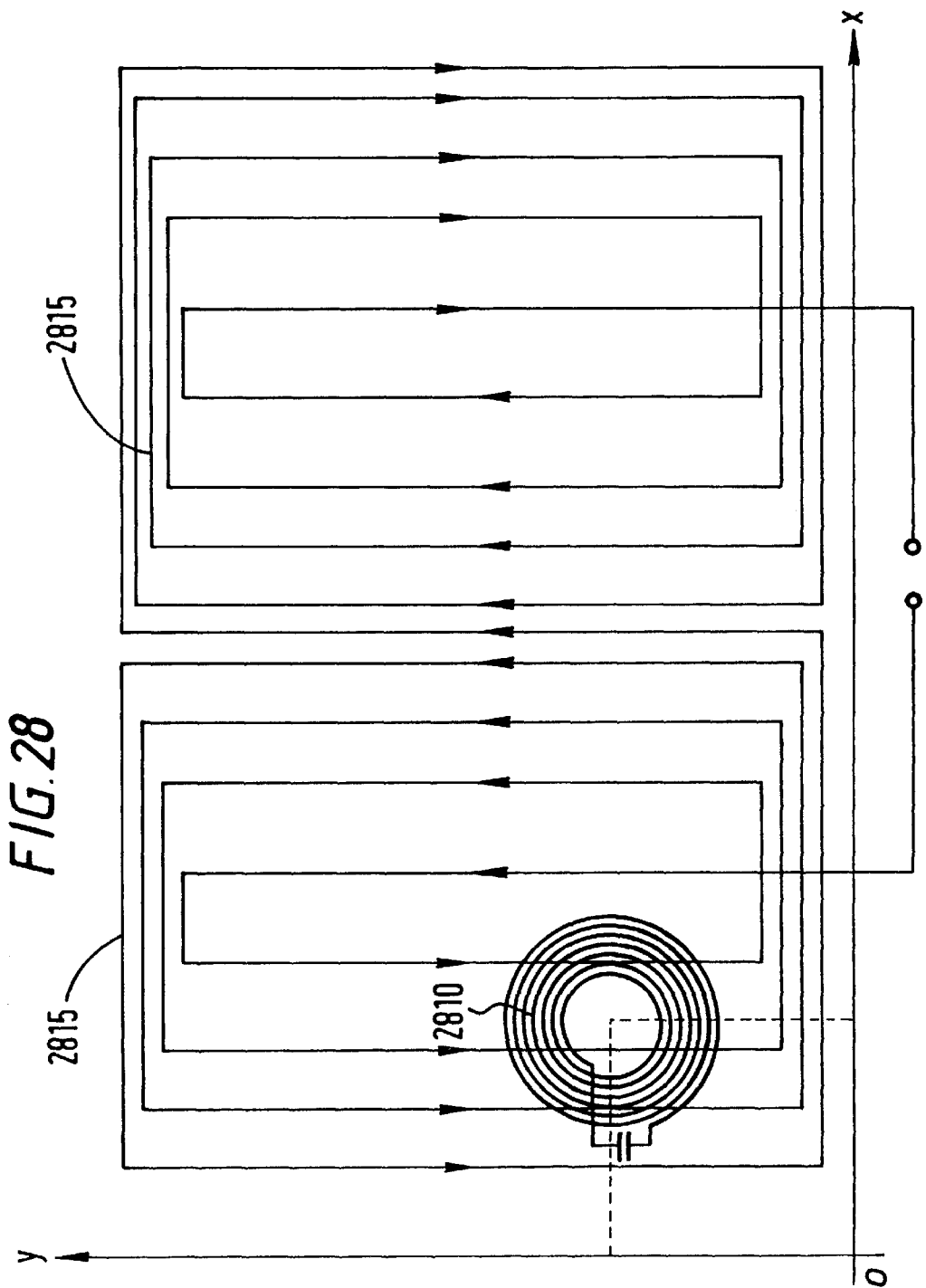

POSITION ENCODER

FIELD OF THE INVENTION

The present invention relates to linear, rotary and radius position encoders generally. The invention has particular although not exclusive relevance to non-contact linear, rotary and radius position encoders. The invention is particularly suited for use in systems where there may be electromagnetic interference.

DISCUSSION OF THE PRIOR ART

Many types of non-contact linear position sensors have been proposed. A system similar to the present invention is the "inductosyn" type system described in U.S. Pat. No. 4,005,396. In particular, U.S. Pat No. 4,005,396 discloses a system that employs a plurality of square wave windings mounted on the surface of a stationary element, and a coil connected to an a.c. power source mounted on a movable element. The square wave windings each comprise a plurality of "high" and "low" parts and have different periods. The system determines the position of the movable element relative to the stationary element by utilising the variation in mutual inductance between the coil and the plurality of square wave windings. More specifically, when the power source energises the coil, a large current is induced in a square wave winding if the coil is adjacent a high part thereof. Only a small current is induced in a winding if the coil is adjacent a low part thereof. Therefore, the position of the movable element along the length of the stationary element can be determined from the signals on the windings.

However, this system has a number of disadvantages. Firstly, the system is not "balanced", i.e. it is not immune to electromagnetic interference. The present inventors have realised that this is because the ground connection is through a base plate or the like and there is no symmetry in the system. Indeed U.S. Pat. No. 4,005,396 acknowledges the interference problem and tries to solve it by providing an additional winding designed to detect electromagnetic interference. The signal from this extra winding is then used to adjust the signals from the square wave windings. However such a solution requires an additional "interference" winding which increases the system complexity and therefore manufacturing cost.

Secondly, the system is sensitive to variations in the power level of the power source and is relatively sensitive to changes in the separation between the movable element and the stationary element. The present inventors have realised that this is because the system relies on amplitude modulating the signal from the power source and no ratiometric type calculation is performed. However, this document offers one solution to the separation problem which involves constraining the movement of the movable element by providing guide rails along which the movable element runs. Although this solution may work in some applications, it will not work for all applications. For example it will not work in a lift system, since it is impractical to constrain the lift so that there is no significant lateral movement within the lift shaft.

Thirdly, the use of square wave windings give rise to the problem that if measurements are made close to the windings (i.e. at a spacing of typically less than ⅛ of the period of windings then the shape of the winding as perceived by the pick up device gives rise to harmonics e.g. third, fifth, seventh etc harmonics which distort the measured results which are obtained.

The present applicant has already proposed a rotary position encoder in WO94/25829 which employs an excitation coil, two receive coils and a resonant circuit mounted on the rotatable element. The arrangement is such that in response to an excitation current in the excitation coil, the resonant circuit produces signals in the receive coils whose amplitudes depend upon the orientation of the rotatable element. Therefore, by suitable processing the orientation of the rotatable member can be determined. However, the disclosure of this reference does not extend beyond rotary positioning encoding.

SUMMARY OF THE INVENTION

In one aspect the invention provides an apparatus for indicating the relative position of first and second members in which one of the members carries a transmitter circuit which is coupled by electromagnetic induction to a receiver circuit carried by the other of said members to cause a signal to appear representing the relative positions of the first and second members, wherein at least one of the transmitter or receiver circuits comprises a plurality of electrically separate conductors located one on the other and each comprising a first portion extending away from a position on the member in a repetitive pattern of convolutions and a second return portion having similar convolutions, the convolutions of the first and second portions being substantially 180° out of phase so as to define a repetitive pattern of loops of first and second types which provide opposite electrical responses to a far field, whereby a response induced in loops of a first type by a disturbance from the background is at least partly balanced by the response induced in loops of the second type, and wherein the convolutions that form each conductor are spatially separated in the measurement direction from the convolutions of the other conductors. In a variant of this apparatus the transmitter or receiver is of simpler structure and has only a single alternation of the loops of the first and second types.

The present apparatus lends itself to the determination of the relative position of a first member which contains passive devices or devices powered by external magnetic induction from an energising loop and does not require external connections or electrical or mechanical contact with the second member which carries, in this instance, a receiver circuit.

Advantageously the first member carries a LC resonator and the second member carries an excitation group fed with an AC signal that excites the resonator and also carries a receiver circuit comprising conductors disposed in sinusoidal tracks in quadrature. This arrangement may permit both interpolation using the received signals to give a high accuracy of measurement and may enable sinusoidal signals to be received even where the space in between the receiver circuit and the track is small. The use of balanced or crossing conductors to form the transmitter or receiver circuit reduces sensitivity to the far field or to other external perturbations such as metallic bodies located close to the receiver circuit.

The invention also provides apparatus for indicating the position of a first member relative to a second member, comprising input means carried by the first member and output means carried by the second member and coupled to the input means to cause a signal to appear at the output means which indicates the relative positions of the first and second members, characterised in that at least one of the input means and the output means comprises at least one conductor having a first portion extending away from a position on the second member in a pattern of sinusoidal convolutions and a second return portion having similar convolutions, the convolutions of the first and second portions being substantially 180° out of phase.

Output signals in quadrature derived from tracks with sinusoidal conductors can be processed ratiometrically to give an output whose value is insensitive to the spacing between the first and second members.

The invention also provides a position encoder that has balanced transmitter and/or receiver coils or windings.

In another aspect the invention provides a position encoder having transmitter or receiver windings having a magnetic field pattern or magnetic field sensitivity (as the case may be) that varies sinusoidally in the measurement direction irrespective of distance from the transmitter or receiver windings.

When used as a translational position encoder, the invention may comprise a lift having means for indicating its position in a lift shaft, said means being relative position indicating apparatus as aforesaid. The translational position encoder may be used to determine the relative position of other fixed and movable members in engineering and metrology, for example the position of a movable printer head of a dot matrix or ink jet printer or similar device relative to the supporting structure within which the printer head reciprocates.

The invention also provides a liquid level sensor comprising a float, a support on or in which the float is slidably guided, and a linear position encoder in the form of the relative position measuring apparatus as aforesaid.

The invention is also applicable to shaft position encoders, for example for a valve or throttle having a rotary shaft and a position encoder for each shaft, the encoder being a rotary encoder as aforesaid. Such an encoder is advantageously used for the monitoring of shafts of limited angular travel, e.g. less than 180° and in particular not more than 120°. Such limited travel shafts can be used to control for example gate valves which can be turned on or off within a 90° rotational movement, and vehicle throttle shafts where the angular movement is usually not more than 120°.

The invention is applicable to industrial process control, for example to a fluid flow meter comprising a tapered tube and a float in the tube that is displaced to a longitudinal position determined by the flow of fluid, relative position indicating apparatus as aforesaid being provided for indicating the relative position of the float and the tube. Such apparatus may additionally be provided with means by which rotation of the float, which may contain one or more resonators, may be monitored or compensated for.

BRIEF DESCRIPTION OF THE DRAWINGS

How the invention may be put into effect will now be described, by way of example only, with reference to the accompanying drawings, in which:

FIG. 2a is an isometric view of a linear positioning encoder embodying the present invention that is used in the lift system shown in FIG. 1;

FIG. 2b is an end view of a thin sliver cut from a position encoder track forming part of the encoder of FIG. 2a;

FIG. 5b is a graph showing output voltage against time for an integrator forming part of the circuitry of FIG. 4a;

FIG. 7 schematically shows one example of an absolute position encoder embodying the present invention;

FIG. 8a shows another absolute position encoder embodying the present invention and the processing circuitry required to determine the resonant circuit position.

FIG. 10 shows another absolute position transducer embodying the present invention;

FIG. 11 schematically illustrates an alternative linear position encoder embodying the present invention;

FIG. 12c shows a four-phase spiral winding and its associated processing circuitry;

FIG. 14b schematically illustrates a resonant circuit that is suitable for use in the rotary embodiment illustrated in FIG. 14a;

FIG. 22 is a plan view of another float arrangement that can be used in the liquid level sensor system shown in FIG. 13a;

FIG. 23 schematically illustrates a fluid flow rate sensing system employing a transducer according to the present invention;

FIG. 24a schematically shows a float that is suitable for use in the fluid flow rate system shown in FIG. 23;

FIG. 24b schematically illustrates a preferred form of the float used in the fluid flow rate system shown in FIG. 23;

FIG. 24c shows in section another fluid flow rate system employing two transducers embodying the present invention;

FIG. 24d schematically illustrates the form of the float used in the fluid flow rate sensing system shown in FIG. 23 when the float is spherical;

FIG. 25 is an isometric view illustrating how orthogonal excitation coils may be formed around the support in the liquid level sensing system shown in FIG. 13;

FIG. 28 shows part of a two-dimensional displacement transducer according to another embodiment of the invention;

DETAILED DESCRIPTION OF PREFERRED EMBODIMENTS

Figure 1:
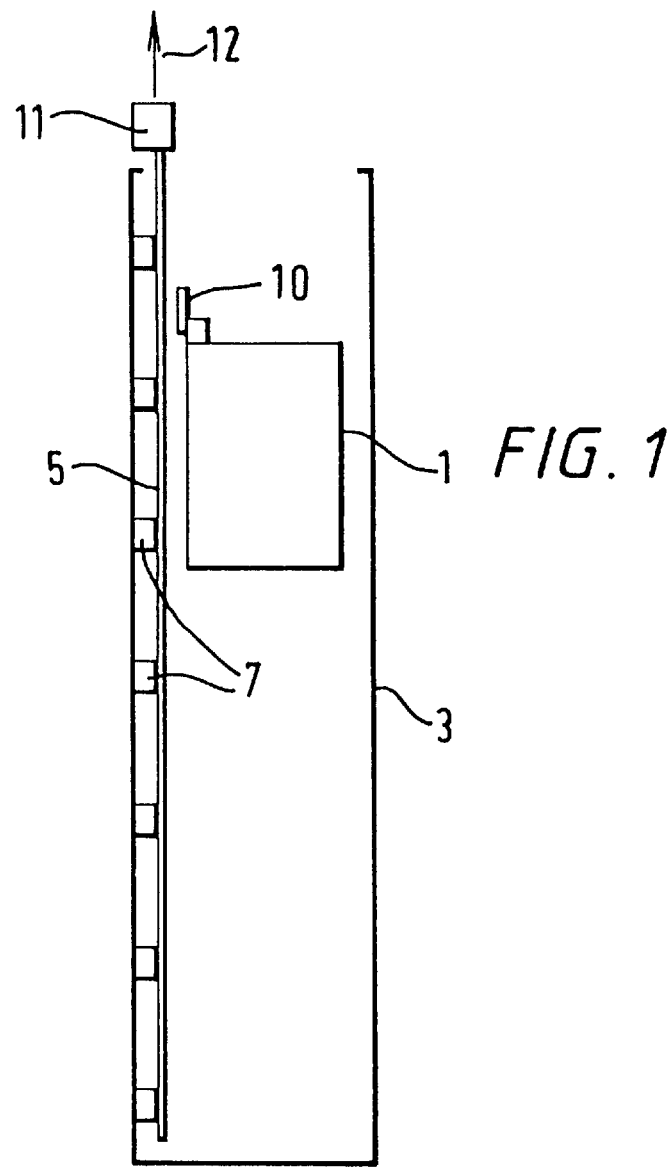
FIG. 1 schematically shows a lift system having a position encoder embodying the present invention.

FIG. 1 schematically shows a lift system having a lift 1 that travels up and down a lift shaft 3. Attached to one of the side walls of the lift shaft 3 there is a transducer support 5 of electrically insulating material attached to the wall by fixing points 7. Mounted on the support 5 there is a transducer (not shown) which is connected to an excitation and processing unit 11. In this embodiment, a resonant circuit 10 is mounted on top of the lift such that when excited, it generates signals in the transducer (not shown) which are dependent upon the position of the lift within the shaft 3. These signals are then processed by the excitation and processing unit 11 which determines the position of the lift and outputs signals 12 to the lift controller (not shown). The processing circuitry can also determine the velocity and acceleration of the lift from past position indications, which information can be used by the lift controller (not shown) to optimally control the lift.

To operate effectively in the lift environment, the sensor system must be relatively insensitive to the separation between the transducer support 5 and the resonant circuit 10, since lifts are prone to lateral movement. Indeed, the system should typically be tolerant to shifts in lateral movement of about ±8 mm in any direction.

Present lift systems use a combination of rope and pulley sensors, optical fin sensors and shaft encoders on the motor and winding gear. However, these sensors have the following drawbacks. In the rope and pulley system, the rope is connected to the lift and runs over a pulley wheel which has a rotary encoder mounted on it. This system suffers from rope slip over the pulley and badly defined dynamics if the length of the lift shaft is large. Mechanical wear is also a problem. In the optical fin system, a fin at each floor interrupts an optical beam break sensor mounted on the lift. This system can be used to compensate the slip of the rope and pulley system. However, since the lift controller is mounted on the lift shaft and needs to communicate with the sensor, an additional communication link is required between the shaft and the lift. The shaft encoder system suffers from the disadvantage that it is indirect since it acts on the motor and winding gear and not on the lift directly. Therefore, as the system changes due, for example, to stretching of the support ropes with load and time, so the system will lose accuracy.

Figure 2C:
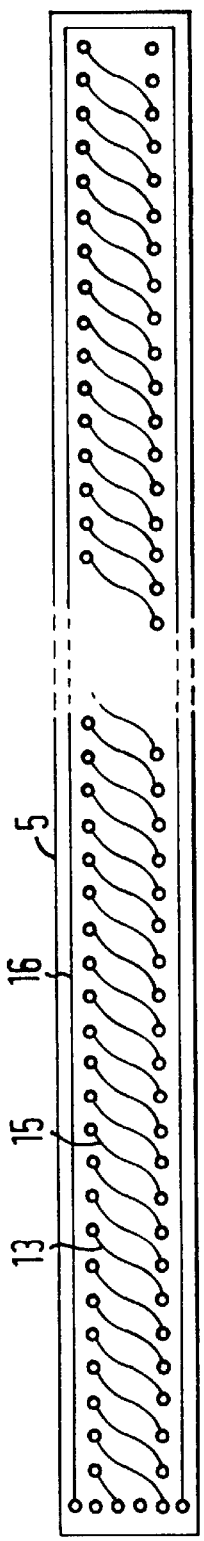
FIGS. 2c and 2d are layers of printed conductors from which a practical encoder track may be formed.
Figure 2D:
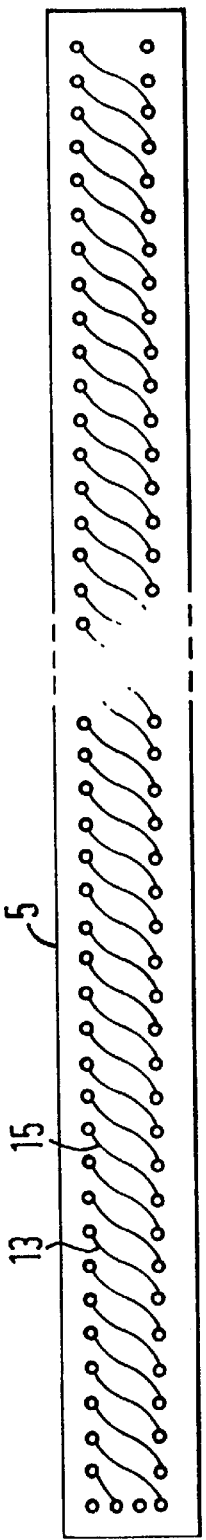
Figure 2E:
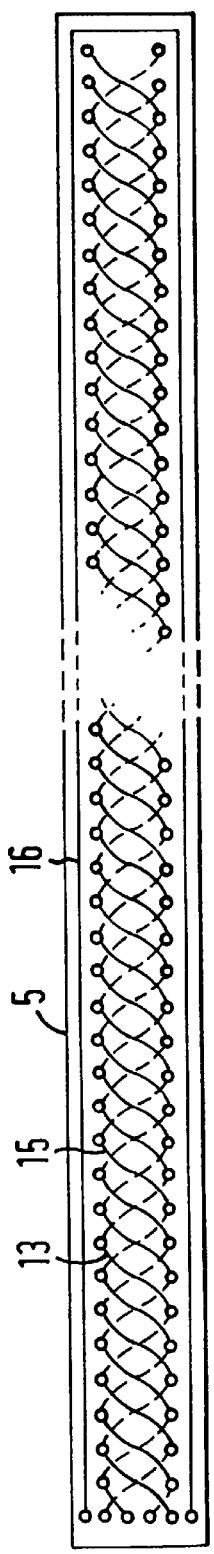
FIG. 2e is a diagrammatic view of the resulting 2-layer printed encoder track.

FIG. 2a is an isometric view of a linear position sensor embodying the present invention, and which may be used in the lift system shown in FIG. 1. As shown in FIG. 2, there are a pair of phase quadrature conductive windings 13 and 15 and an excitation loop 16 mounted on a support 5. In a simple form as shown to in FIG. 2b the windings 13, 15 and the excitation loop 16 could take the form of insulated wires of copper or other conductor adhered e.g. by an epoxy adhesive in the required pattern onto a substrate 5 of fibre glass or other flat insulating sheet material. In a more developed form as shown in FIGS. 2c to 2e conductive patterns are formed in successive printed circuit layers which are shown in FIGS. 2c and 2d, each layer having conductors in a printed pattern as shown and extending between via holes. When the two layers are superimposed and connected through the via holes as shown in FIG. 2e there is obtained a track of the required sinusoidal or "spiral" configuration. The same principle can be used to provide additional layers e.g. of other "spiral" conductors or coarse position indicating tracks as described in more detailed below.

Each winding 13 and 15 starts from one end 5a of the support 5 and follows a sinuous path therealong until it reaches the other end 5b, where it returns back along the support 5 following a sinuous path to the starting end 5a. The sinusoidal forward and return paths that form each winding 13 and 15 have period $T_s$ and are in antiphase, i.e. they are substantially 180° out of phase. The windings 13 and 15 shown in FIG. 2 and described above, will hereinafter be referred to as "spiral windings" since they visually resemble a flattened helix. The spiral windings 13 and 15 are insulated from each other, either by using via holes to the other side of the support 5 at the cross-over points, or by using a laminated conductor-insulator structure. If a laminate structure is used, the support 5 should be non-magnetic and preferably non-conducting for reasons that will become apparent later. The spiral windings 13 and 15 may be formed using any conductive wire, but are preferably formed by etching or other standard printed circuit board technique. The excitation loop 16 runs around the periphery of the support 5 and may comprise a single loop of conductor or alternatively may comprise many turns of conductive wire.

Each end of the spiral windings 13 and 15 and the excitation loop 16 are connected to the excitation and processing unit 11. As those skilled in the art will realise, in practice the excitation and processing circuit 11 can be provided by a power source and a single semiconductor integrated chip.

FIG. 2a also shows a coil of wire 14 and a capacitor 17 that together form the resonant circuit 10 that is mounted on top of the lift 1 shown in FIG. 1. As represented by arrows 19, the resonant circuit 10 is free to move along the length of the support 5, i.e. along the x-axis of FIG. 2a. Preferably, the axis 21 of the coil 14 is orthogonal to the surface of the support 5 on which the spiral windings 13 and 15 are mounted, as this provides the greatest magnetic coupling between the spiral windings 13 and 15 and the coil 14. The configuration of the excitation loop 16 is designed to give constant coupling with the resonant circuit 10 irrespective of its position along the length of the support 5.

The wire used to form coil 14 can be of any conductive material but is preferably Litz wire which is a multi-stranded wire having low a.c. resistance. Litz wire is available from Elektrisola Dr. Gerd Schildbach GmbH & Co., of Inderhuvttenwiese D-5226 Reichshof-Eckenhagen, Germany.

Figure 2F:
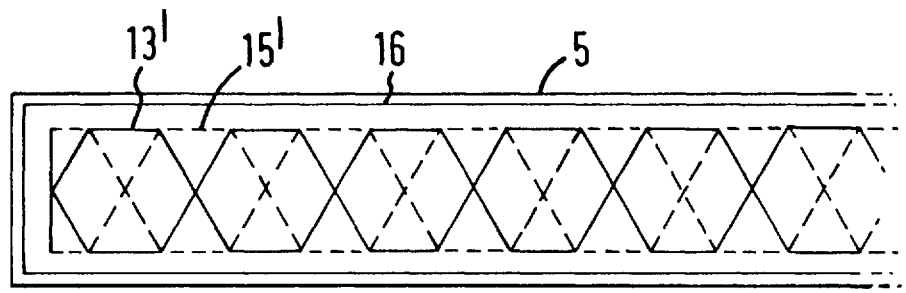
FIGS. 2f, 2g and 2h show alternative configurations of the conductors that form the encoder track.
Figure 2G:
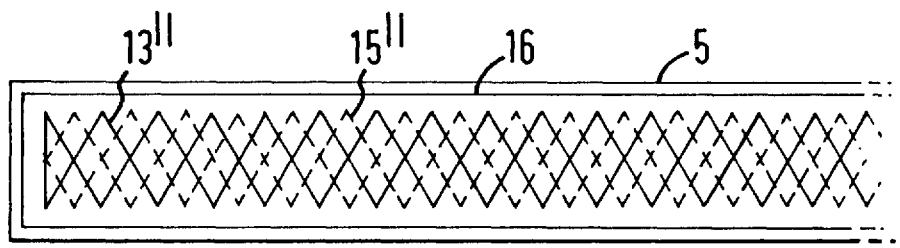
Figure 2H:
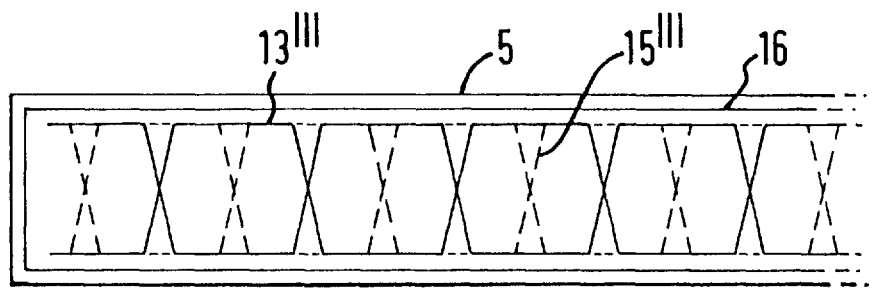

FIGS. 2f, 2g and 2h show alternative configurations of the windings. In FIG. 2f the windings have, when viewed overall, a hexagonal configuration, in FIG. 2g they are triangular and in FIG. 2h they are square waves.

The operation of the sensor system shown in FIG. 2 will now be briefly described. When the position of coil 14 along the x-axis relative to the support 5 is to be determined, a burst of excitation current is applied to the excitation loop 16. The frequency of the burst should be such that it causes the circuit 10 to resonate. When the burst ends, the circuit 10 continues to resonate for a short period of time, and induces a current in each spiral winding 13 and 15. The magnitude of the current induced is dependent upon the position of the resonant circuit 10 along the x-axis. Therefore, by suitable processing of the currents induced in the spiral windings 13 and 15, the position of the resonant circuit 10 within a period of the windings 13 and 15 can be determined. As will become apparent later, two phase quadrature spiral windings are required to give unambiguous readings over the whole period $T_s$ of the spiral windings 13 and 15. In the present embodiment, absolute position is determined by using a counter within the excitation processing unit 11 that counts the periods through which the resonant circuit has moved from a reference point. Preferably the reference point is defined by an additional conductor loop (not shown) at a chosen position on the support 5 as this allows the excitation processing unit 11 to recover absolute position after power has been removed by simply moving the resonant circuit 10 until the signal level in this additional loop is maximised. Additionally, improved accuracy may be achieved by averaging the values obtained over several such excitation and processing stages.

Figure 3:
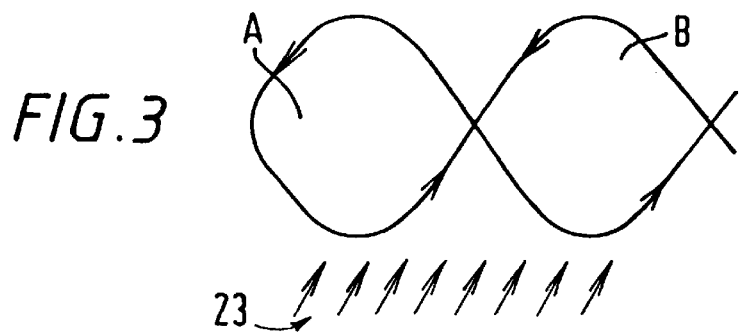
FIG. 3 shows a single period of a "spiral winding" and the effect that far-field electromagnetic interference has on it.

Although the operation of the circuit described above is in some respects similar to that of an "inductosyn" type variable phase transformer for sensing linear displacement, using the spiral windings 13 and 15 provides several advantages. In particular, since the windings 13 and 15 are not digital in nature, i.e. they are continuously varying along the length of the support 5, the resolution of the system is theoretically infinite. In practice, however, the output signals are processed digitally and the resolution of the analog-to-digital converter (ADC) in the processing circuitry which digitizes the signals from windings 13, 15 will determine the resolution of the system. Another advantage of the spiral windings is that since the sinusoidal forward and return paths that form each winding 13 and 15 are in antiphase, the induced currents that flow in any loop and its adjacent loop are in opposite directions so that the corresponding magnetic fields are of opposite polarity and are effectively balanced. Therefore, they are relatively immune to electromagnetic interference. This is because, as is shown in FIG. 3, any current induced in one loop A of a winding due to background electromagnetic radiation 23 is cancelled out by the current induced by the same background electromagnetic radiation in the adjacent loop B of the winding. Yet another advantage of the spiral windings is that their magnetic field sensitivity measured at any distance from the windings in a line parallel to their axis is sinusoidal. As a result, the system can be more tolerant to changes in the separation between the resonant circuit 10 and the support 5, i.e. movement along the y-axis, than the prior art inductosyn systems. In particular, the sensitivity of the spiral winding remains sinusoidal even for small separations between the resonant circuit 10 and the windings 13 and 15. Additionally, the system is relatively insensitive to dirt, dust, grease etc. that can affect the proper operation of optical type position sensors.

It should be noted that since the excitation loop 16 generates an even magnetic field along the length of the windings 13 and 15 and since the windings are balanced, the excitation loop and the windings 13 and 15 are effectively orthogonal. In other words the excitation loop 16 will not, in theory, induce current in the windings 13 and 15 and so the system could be operated in continuous waves (CW) mode i.e. excitation and reception of signals at the same time. However, in practice due to imperfections in the spiral windings especially at the ends thereof, some current will be induced in them by the excitation loop current. Therefore, the preferred mode of operation, in this embodiment at least, is pulse-echo i.e. transmit and then receive and process after the excitation has been removed.

Figure 4A:
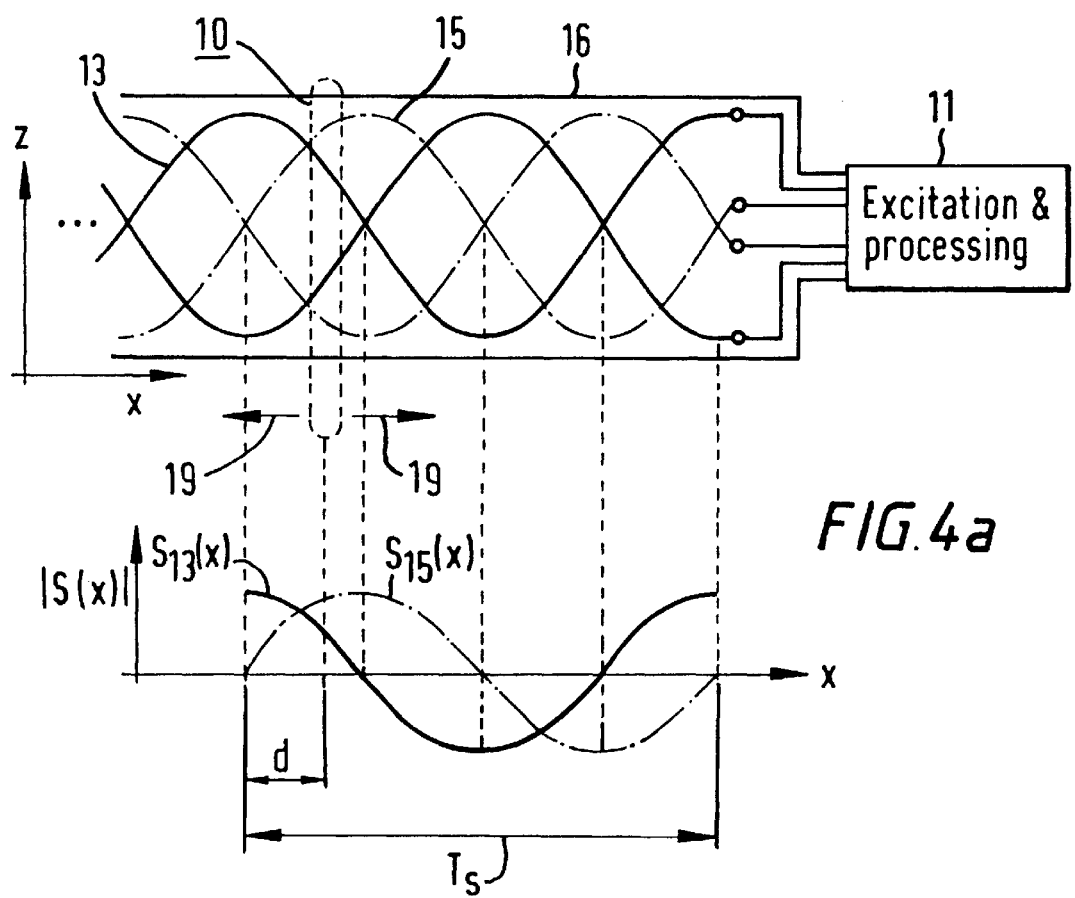
FIG. 4a schematically illustrates a part of the linear positioning encoder shown in FIG. 2a and contains a plot of its magnetic sensitivity against resonator positions.

The principle of operation of the system shown in FIG. 2 will now be described in more detail with reference to FIGS. 4, 5 and 6. FIG. 4a is a schematic diagram showing part of the spiral windings 13 and 15, the excitation loop 16 and the resonant circuit 10. As illustrated by arrows 19 the resonant circuit 10 is free to move in either direction along the axis of the spiral windings 13 and 15, i.e. along the x-axis. FIG. 4a also shows a plot of the sensitivity function S(x) of each spiral winding to the magnetic flux density generated by the resonant circuit 10 as a function of the position x of the resonant circuit 10 along the support 5. As the resonant circuit 10 moves along the spiral windings 13 and 15, the corresponding sensitivity functions $S_{13}(x)$ and $S_{15}(x)$ vary in a phase quadrature sinusoidal manner, and are given by:

$$S_{13}(x) = A \cos\left(\frac{2\pi x}{T_s}\right) \quad (1)$$

$$S_{15}(x) = A \sin\left(\frac{2\pi x}{T_s}\right) \quad (2)$$

(where x and $T_s$ are as defined above and A is the peak amplitude of the sensitivity function).

Figure 4B:
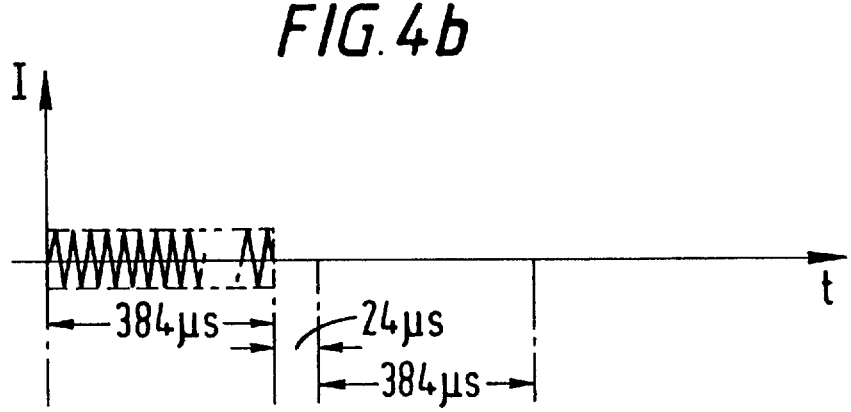
FIG. 4b is a diagram showing an energising pulse and FIG. 4c is a diagram showing the current induced in the resonant circuit in response to the excitation current.
Figure 4C:
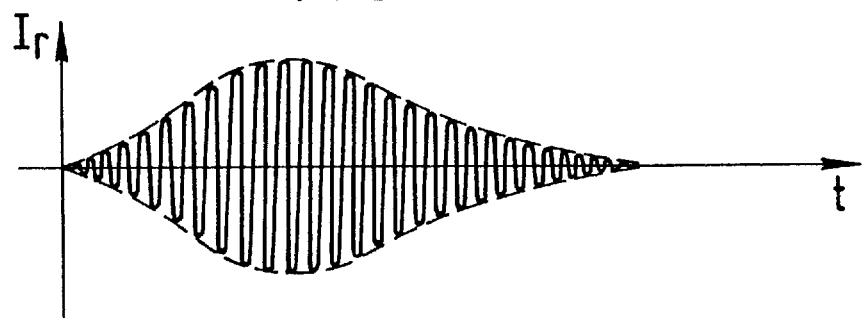

FIG. 4b shows the burst of excitation current that is applied to the excitation loop 16 shown in FIG. 4a. Each burst comprises a number of cycles of an excitation current. The number of cycles transmitted depends on the resonant frequency and quality factor (Q) of the resonant circuit 10. In this embodiment a burst of 64 cycles of a triangular wave signal having period 6 µs is applied to the excitation coil 16, which is sufficient to cause circuit 10 to resonate. FIG. 4c shows that the current $I_r$ in the resonant circuit 10 increases in magnitude and begins to level off just before the excitation current is removed. After the burst ends, the circuit 10 still resonates but the amplitude of the current $I_r$ decreases in an exponential manner with time. To allow the signal time to settle, the excitation and processing unit 11 waits for a short period of time, about 4 excitation cycles in this embodiment, before processing the signals on the windings 13 and 15.

Therefore, after the burst of excitation current has been removed the current flowing in the circuit 10 can be represented by:

$$I_r = \hat{I}_r e^{-\frac{t}{\tau}} \sin(2\pi f_r t) \quad (3)$$

where $f_r$ is the resonant frequency of the circuit 10, which in this embodiment is approximately 166 Khz, and where the exponential term which contains time t and the decay time τ represents exponential decrease in current amplitude with time.

The current $I_r$ flowing in the resonant circuit 10 creates a magnetic flux density $B_r$, in the direction of the axis of the coil 14 that forms part of the resonant circuit, and can be represented by:

$$B_r = K_1 \hat{I}_r e^{-\frac{t}{\tau}} \sin(2\pi f_r t) \quad (4)$$

where $K_1$ is a constant of proportionality that depends on the physical nature of the coil 14, i.e. the number of turns, the radius, etc. The alternating magnetic flux density $B_r$ induces an electromotive force (EMF) in each spiral winding 13 and 15 that is proportional to the rate of change of the magnetic flux density $B_r$, and that is amplitude modulated by the respective sensitivity function $S_{13}(x)$ and $S_{15}(x)$ of the corresponding spiral winding 13 and 15. Therefore, when the resonant circuit 10 is in the position shown in FIG. 4 the EMF induced in spiral winding 13 will be given by:

$$EMf_{13} = 2\pi f_r K_2 \hat{I}_r e^{-\frac{t}{\tau}} S_{13}(d)\cos(2\pi f_r t) \quad (5)$$

and the EMF induced in spiral winding 15 will be given by:

$$EMf_{15} = 2\pi f_r K_2 \hat{I}_r e^{-\frac{t}{\tau}} S_{15}(d)\cos(2\pi f_r t) \quad (6)$$

where $K_2$ is a constant of proportionality dependent upon $K_1$ and the area enclosed by each spiral winding.

In the present embodiment, with each spiral winding 13 and 15 having a peak to peak separation of approximately 35 mm and a period of 200 mm and with the coil 14 of circuit 10 having a length of 100 mm (i.e. in the z-direction of FIG. 4a), width of 50 mm (i.e. in the x-direction of FIG. 4a) and a separation of 10 mm from the support 5, and with the excitation loop 16 having a width of 45 mm (i.e. in the z-direction of FIG. 4a), a peak EMF of approximately 180 mV per amp of excitation current may be induced in the spiral windings.

Figure 5A:
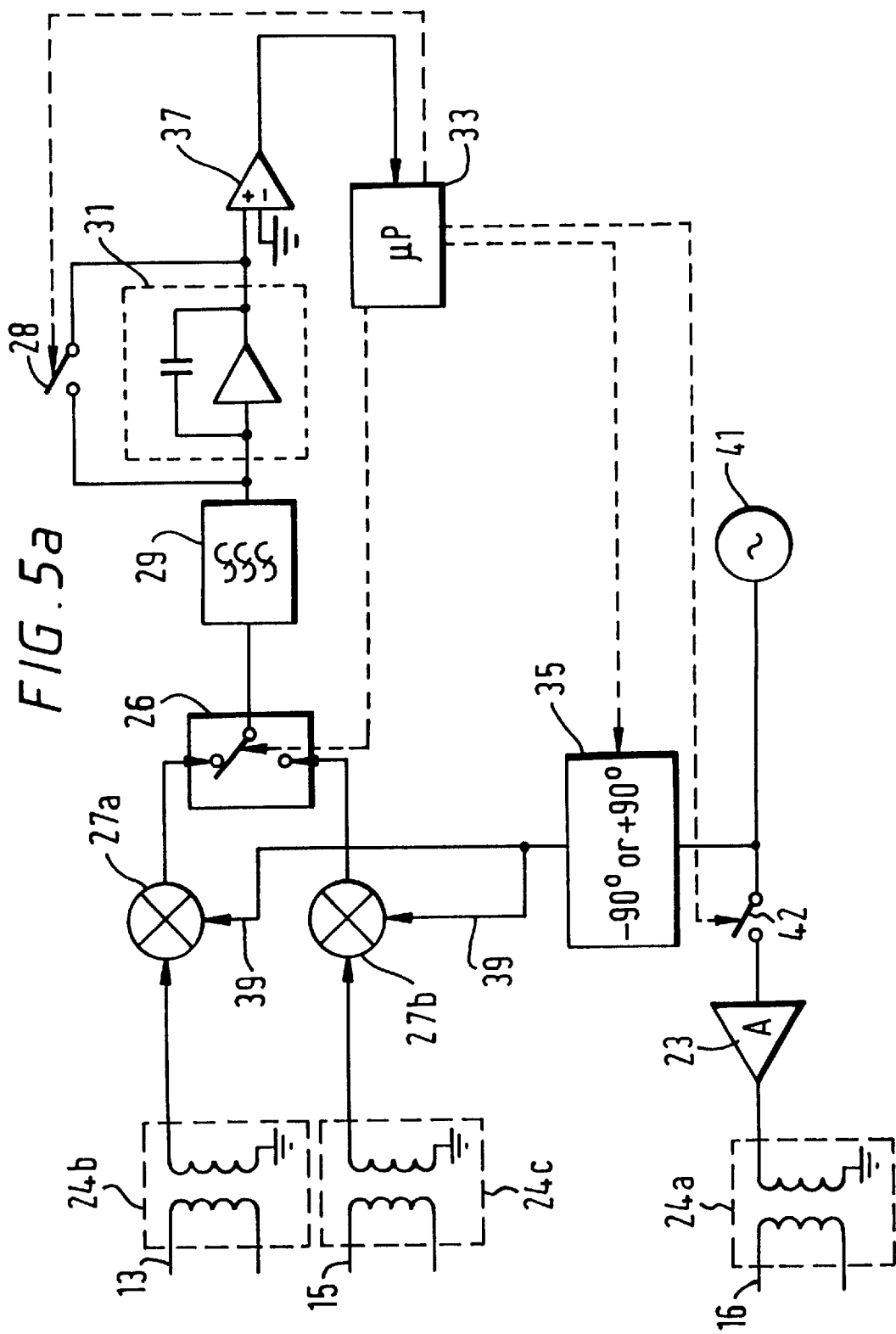
FIG. 5a is a schematic representation of preferred excitation and processing circuitry used to determine for the positioning encoder of FIGS. 2a and 4a the position of the resonant circuit.

To determine where along the length of the spiral windings the resonant circuit 10 is, i.e. to determine the value of d within the period $T_s$, the signals from the spiral windings 13 and 15 are processed in the excitation and processing unit 11. FIG. 5a schematically shows excitation and processing circuitry that may be used to calculate the position of the resonant circuit 10 within the period $T_s$ of the spiral windings 13 and 15. As shown in FIG. 5a there is a signal generator 41 that generates the excitation current that is applied to the excitation loop 16 via switch 42, amplifier 23 and transformer 24a. As mentioned above, in the present embodiment the excitation current is a triangular wave having period 6 μs and is applied to the excitation loop 16 in a burst of duration 384 μs. After the excitation signal has been removed from the excitation loop 16, i.e. when switch 42 opens the signals from spiral winding 13 are fed into one terminal of a two way switch 26 via a transformer 24b which removes common mode noise and a mixer 27a which demodulates the incoming signals. Similarly, signals from spiral winding 15 are fed into the other terminal of the two way switch 26 via another transformer 24c and mixer 27b. Each mixer 27a and 27b demodulates the incoming signals by multiplying them with a phase shifted version 39 of the transmit signal. In particular, a +90° phase shifted version or a −90° phase shifted version. A −90° phase shift is required since the resonant circuit 10 imparts a −90° phase shift on the excitation signal. The reason for the +90° alternative will be described later. Therefore, the signals at the output of the mixer 27a are given by:

$$V_{13} = K_3 S_{13}(d) + K_3 S_{13}(d)\cos 4\pi f_r t \quad (7)$$

and the signals of the output of mixer 27b are given by:

$$V_{15} = K_3 S_{15}(d) + K_3 S_{15}(d)\cos 4\pi f_r t \quad (8)$$

These signals are then multiplexed by switch 26 and filtered by low pass filter 29 to remove the high frequency components to give:

$$\tilde{V}_{13} = K_4 \cos\left(\frac{2\pi d}{T_s}\right) \quad (9)$$

$$\tilde{V}_{15} = K_4 \sin\left(\frac{2\pi d}{T_s}\right) \quad (10)$$

The filtered signals are then converted into digital signals by a dual slope type analog-to-digital converter, which has been adapted to use as inputs the two signals in quadrature and which outputs the ratio of the two filtered signals. This is achieved in the following manner. Firstly, the signal $\tilde{V}_{13}$ from spiral winding 13 is applied to integrator 31 (having time constant RC) for a fixed time $t_0$. The output of the integrator 31 will ramp-up with slope $\tilde{V}_{13}$/RC if $\tilde{V}_{13}$ is positive and will ramp-down with slope $\tilde{V}_{13}$/RC if $\tilde{V}_{13}$ is negative. While the integrator 31 is ramping up, or down as the case may be, a counter (not shown) in microprocessor 33 counts up at a fixed rate $f_c$. Then at the end of the fixed time $t_o$, the microprocessor 33 stores the value $N_{13}$ that the counter (not shown) has reached, and operates switch 26 so that the signal $\tilde{V}_{15}$ from spiral winding 15 is applied to the integrator 31. As switch 26 is operated, the microprocessor 33 activates the +90° phase shift block 35 if the sign of the signal from winding 15 is the same as the sign of the signal from winding 13, otherwise it maintains the −90° phase shift. This ensures that the integrator 31 always ramps in the opposite direction in response to $\tilde{V}_{15}$ than it does in response to $\tilde{V}_{13}$. Therefore, if the signals from the two windings are both positive, then the +90° phase shift will be applied and $V_{15}$ will be inverted and so the integrator 31 will ramp down with slope $\tilde{V}_{15}$/RC. While the integrator 31 ramps down, the counter within the microprocessor 33 counts up at the same rate $f_c$ as during the ramp-up stage. When the output of the integrator 31 reaches zero, the output of the comparator 37 toggles and stops the counter in the microprocessor 33.

Figure 5B:
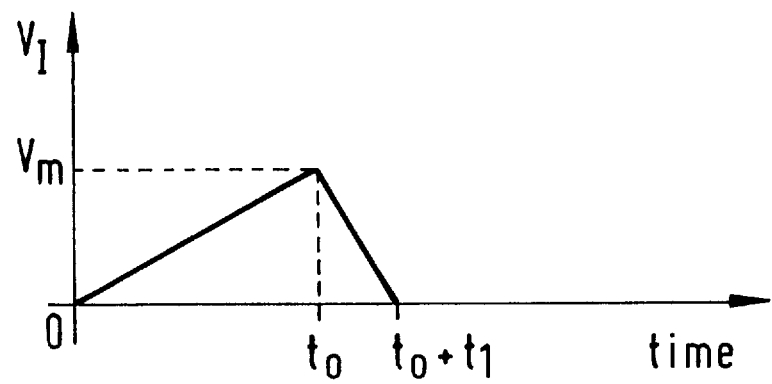

FIG. 5b shows in more detail the signal output from the integrator 31 when the signals from both windings are positive. The value of $N_{13}$ is given by the time $t_0$ multiplied by the rate $f_c$ at which the counter counts up. However, from FIG. 5b it is apparent that at $t_o$ the voltage $V_m$ is given by $t_0$ times the rate at which the integrator voltage ramps-up. Therefore, $N_{13}$ is given by:

$$N_{13} = f_c t_o = f_c V_m \left(\frac{RC}{\tilde{V}_{13}}\right) \quad (11)$$

Similarly, the value of $N_{15}$ is given by the time taken for the integrator 31 to count down to zero i.e. $t_1$ multiplied by the rate $f_c$ at which the counter counts up. However, from FIG. 5b it is apparent that $t_1$ equals $V_m$ divided by the rate at which the integrator voltage ramps-down, i.e.:

$$N_{15} = f_c t_1 = f_c V_m \left( \frac{RC}{\tilde{V}_{15}} \right) \tag{12}$$

Therefore, by dividing $N_{13}$ by $N_{15}$ the resulting digital signal is equivalent to $\tilde{V}_{15}/\tilde{V}_{13}$, which equals:

$$\frac{\tilde{V}_{15}}{\tilde{V}_{13}} = \frac{K_4 \sin\left(\frac{2\pi d}{T_s}\right)}{K_4 \cos\left(\frac{2\pi d}{T_s}\right)} = \tan\left(\frac{2\pi d}{T_s}\right) \tag{13}$$

Therefore, the value of d can be determined, by the microprocessor 33, by performing an inverse tangent function and using an appropriate shift depending on the sign of the demodulated signals output from mixers 27a and 27b. More particularly, d is determined from the following equation:

$$d = \left[ a\tan\left(\frac{\tilde{V}_{15}}{\tilde{V}_{13}}\right) + \pi \text{ (if } \tilde{V}_{15} < 0) \right] \frac{T_s}{2\pi} \tag{14}$$

As those skilled in the art will realise, equation 14 can be implemented by using $N_{15}$ to address a look-up table since the value $N_{15}$ will be directly related to the position of the resonant circuit 10.

In this embodiment the sign of the signals output from mixers 27a and 27b are determined by comparing them with ground using comparator 37. To achieve this, switch 28 controlled by the microprocessor 33 is provided that allows the signals from the filter 29 to by pass the integrator 31.

Assuming that it takes the processing circuitry approximately 400 μs to determine the position of the circuit 10 within a period of spiral winding, then a reading can be taken approximately every millisecond. Therefore if absolute position is lost the velocity of the lift can still be determined provided it is not moving faster than 100 ms$^{-1}$ otherwise aliasing errors will occur.

The excitation and processing circuit shown in FIG. 5a and described above is given by way of example only and should not be construed as limiting in any way.

In the above embodiment, the resonant circuit 10 is excited by a burst of excitation current from the local oscillator 41 which is tuned to the resonant frequency of the circuit 10. The resonant frequency $f_r$ is preferably of the order of 10 Khz to 1 MHz. Much lower than this, i.e. about 100 Hz results in low induced EMF amplitudes in the windings and a poor response time. Much higher, i.e. about 100 Mhz results in loss of accuracy due to cross-coupling between the spiral windings 13 and 15 and increased complexity and expense in the processing electronics.

Figure 6A:
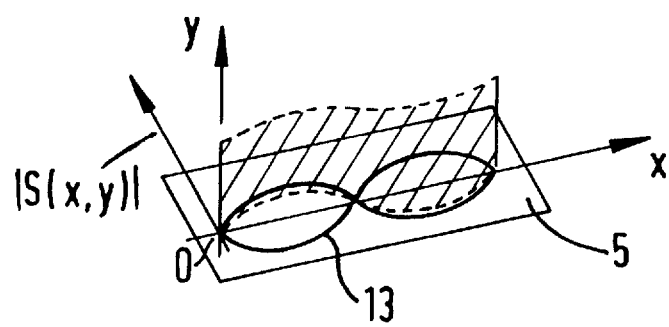
FIG. 6a is a three-dimensional plot of the sensitivity of the spiral windings to an external magnetic field for changing resonator position.
Figure 6B:
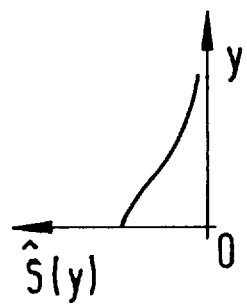
FIG. 6b is a two-dimensional plot of the peak magnitude of the sensitivity as a function of the separation between the resonant circuit and the support.

It was mentioned above that the system shown in FIG. 2 is relatively tolerant to changes in the separation or gap between the spiral windings 13 and 15 and the resonant circuit 10. The reason for this will now be explained with reference to FIGS. 6a and 6b. FIG. 6a is a three dimensional plot of the sensitivity function S(x,y) for one period of a spiral winding. The x-axis of FIG. 6a represents the position of the resonant circuit 10 along the spiral winding 13, the y-axis represents the distance of the resonant circuit 10 from the spiral winding 13 and the z-axis represents the magnitude of the sensitivity function S(x,y) of the spiral winding 13 to the magnetic flux density generated by the resonant circuit 10. FIG. 6b is a two dimensional plot of the peak magnitude $\hat{S}(y)$ of the sensitivity function as a function of the separation between the resonant circuit 10 and the support 5. The peak value $\hat{S}(y)$ of the sensitivity function is shown to decrease as the resonant circuit 10 moves away from the spiral winding 13, i.e. with increasing y. However, FIG. 6a shows that the sensitivity function S(x,y) varies sinusoidally with changing resonant circuit 10 position along the support, regardless of the separation y between the resonant circuit 10 and the support 5. In other words, with the sinusoidal spiral windings the problem of harmonic distortion that is common with prior art devices is removed or at least minimised.

Therefore, the sensitivity function of spiral winding 3 can be represented by:

$$S_{13}(x, y) = \hat{S}(y)\cos\left(\frac{2\pi x}{T_s}\right) \tag{15}$$

The sensitivity function for spiral winding 15 shown in FIG. 1 also has a peak magnitude given by $\hat{S}(y)$. Therefore, when the ratiometric calculation shown in equation 13 is performed, the dependence on the separation y will be removed. The inventors have established that the systems performance is not compromised with separations of between zero and at least a quarter of the spiral period $T_s$. The spiral windings used in the present embodiment have a period of 200 mm. Therefore, the system can withstand separations of upto 50 mm and will therefore meet the ±8 mm lateral movement requirement with ease.

Additionally, it is possible to use the magnitude of the signals induced in the spiral windings to determine the separation between the resonant circuit 10 and the support 5. However, since the magnitude is affected by other system variables such as excitation power etc., the calculations of the separation may not be accurate.

Theoretically, the spiral windings can have any period $T_s$, and therefore the sensor can be of any length. However, as the period $T_s$ of the windings increases, the resolution to which the detector can detect changes in position decreases. The reason is that small changes in position of the resonant circuit 10 within the period $T_s$ of the spiral windings only produce small changes in the sensor signals. Whether these small changes are detected or not, depends on the resolution of the analog-to-digital converter used in the processing circuitry, the signal to noise ratio of the received signal and the spatial accuracy of the windings. Usually, for a given application, the resolution of the ADC is fixed by other system parameters or by cost, and may typically be an 8-bit ADC. The inventors have established that for an 8-bit ADC the resolution achieved with the spiral sensor is about 1/400 of the period $T_s$ of the spiral windings. Therefore, when the system designer specifies the resolution that is required, he effectively specifies the period of the spiral windings.

In the first embodiment a counter was used to allow the system to keep track of the absolute position of the resonant circuit. Another solution to this problem is to provide a coarse and fine set of spiral windings along the length of the sensor. An example of such an arrangement is schematically shown in FIG. 7 which shows part of a 2.4 m long support 5 which has a set of fine quadrature spiral windings 13 and 15 with period 200 mm, and a set of coarse quadrature spiral windings 43 and 45 with period 2.4 m mounted thereon. The signals from the fine spiral windings are used to determine the position of the resonant circuit within the fine spiral period, and the signals from the coarse windings are used to determine which period of the fine windings the resonant circuit is adjacent. As shown in FIG. 7 the fine and coarse set of windings 13, 15 and 43, 45 are superimposed on top of each other, and as in the first embodiment, vias or the like are used at the conductor cross overs. This arrangement is preferred since it maximises the symmetry of the system which in turn maximises the linearity and immunity to interference. For this solution to work, the coarse windings should be able to distinguish between the periods of the fine windings. If this is not possible, then one or more intermediate periodicity windings should be used.

Figure 8B:
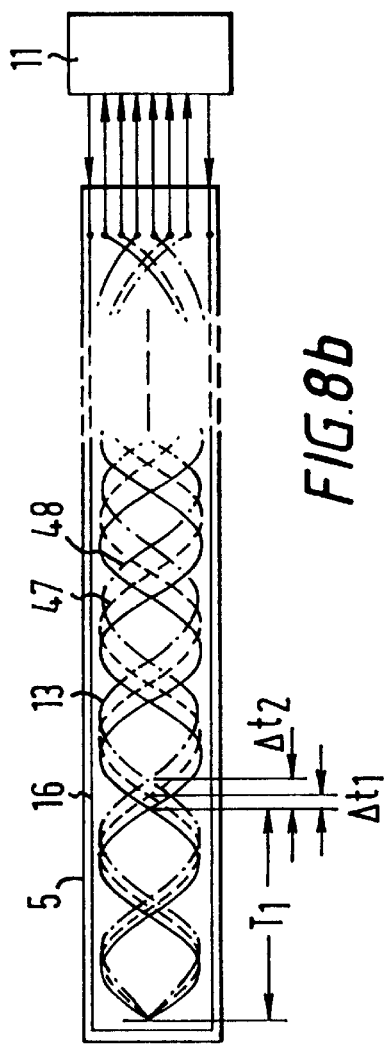
FIG. 8b shows a yet further form of the absolute position transducer and processing circuitry.

Alternative solutions to the period ambiguity problem is shown in FIG. 8. In particular, FIG. 8a shows a first spiral winding 13 having period $T_1$ and a second spiral winding 47 having a slightly greater period $T_1 + \Delta t_1$. Additional quadrature windings will also be required but for clarity are only shown at the processing end 5a of the support 5. The difference in phase between the output signals from the two sets of quadrature windings 13, 47 indicates which period the resonant circuit is adjacent, and the signals from one of the sets of quadrature spiral windings can be used to determine the position within that period in the manner described above. For example the signals $I_1$ and $Q_1$ from the first set of quadrature spiral windings can be used to determine the position of the resonant circuit 10 within the period, and the signals $I_1$ and $Q_1$; $I_2$ and $Q_2$ from all the windings can be used to address a look-up table (LUT) of phase differences which outputs which period the resonant circuit 10 is adjacent. The look-up table will be specific for a particular sensor in which the windings have a period $T_1$ and period $T_1 + \Delta t_1$, and will have to be recalculated for another sensor in which these periods are changed. However, after a certain number of spiral winding periods, this solution will fail since the pattern will repeat. FIG. 8b shows a way to extend the period of the pattern. In particular, in FIG. 8b a third spiral winding 48 is used that has a period $T_1 + \Delta t_2$ different to the period of the winding 47. The outputs from the three spiral windings (and the outputs from the corresponding quadrature windings (not shown) as well) can then be used to infer the correct period.

Figure 9:
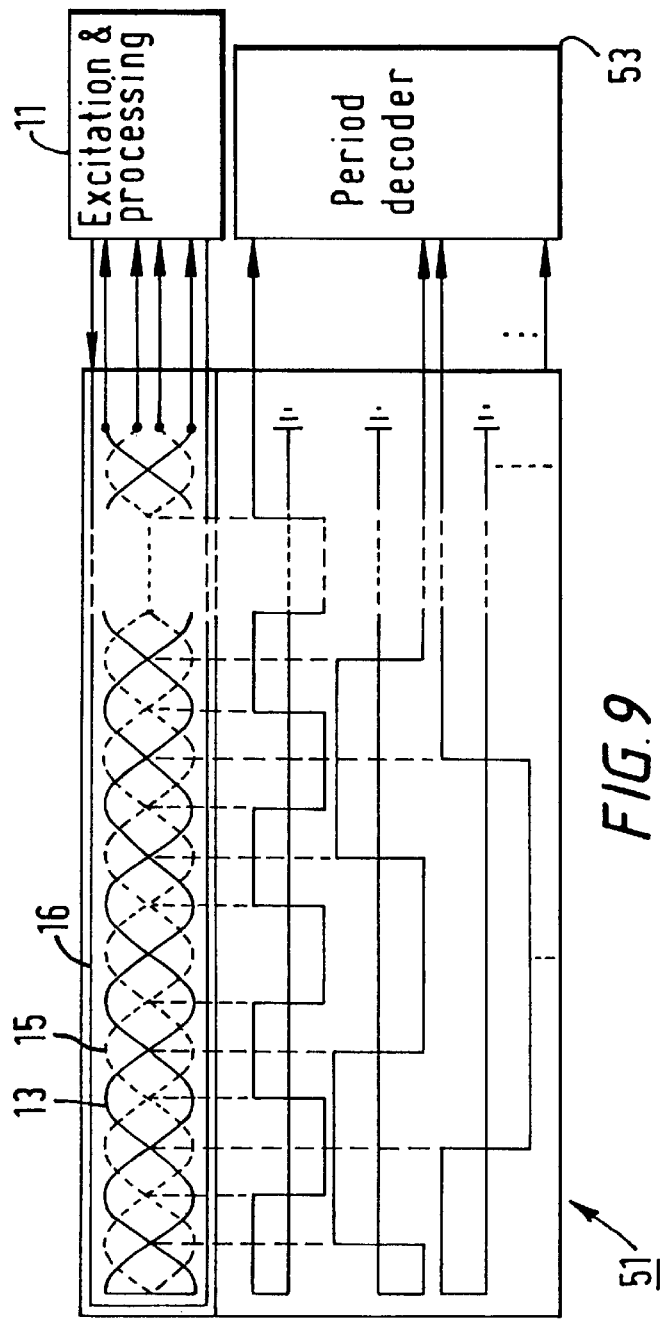
FIG. 9 shows another absolute position encoder embodying the present invention and the processing circuitry required to determine the position of the resonant circuit.

Yet another solution to the period ambiguity problem is illustrated in FIG. 9, which uses a set of gray code windings 51, similar to those employed in U.S. Pat. No. 4,005,396, in combination with the quadrature spiral windings 13 and 15. The gray code windings 51 are shown lying adjacent the spiral windings 13 and 15 for clarity. Preferably, the gray code windings 51 are superimposed on top of the spiral windings 13 and 15 for maximum symmetry and minimum susceptibility to background interference. In this embodiment, the signals from the gray code scale are applied to a period decoder 53 which determines which period of the spiral windings the resonant circuit (not shown) is adjacent and fine positioning within a single period is detected as described above. However, this embodiment suffers from the disadvantage that it is relatively complicated and expensive to manufacture because many additional wires are required to provide the gray code windings 51.

The inventors envisage other solutions to the phase ambiguity problem, such as providing a digital barcode type identifier along the length of the sensor track that can uniquely identify which period the resonant circuit 10 is adjacent. In FIG. 10 this barcode is provided by the separate lower track 44 shown, which is a pseudo-random digital data track which encodes the periods of the spiral windings 13 and 15. As in the FIG. 9 embodiment, the bar code identifier is shown adjacent the track for simplicity but is preferably superimposed on top of the windings 13 and 15.

In the above embodiments two phase quadrature spiral windings 13 and 15 were provided to generate quadrature signals from which the position of the circuit 10 within a period $T_s$ can be determined unambiguously. FIG. 11 shows another way in which quadrature signals can be generated, but this time only using a single spiral winding 13. In particular, FIG. 11 shows a multiperiod spiral winding 13, an excitation loop 16 and two resonant circuits 10a and 10b having different resonant frequencies $f_1$ and $f_2$ respectively. The two resonant circuits 10a and 10b are fixed relative to one another with a separation of one quarter of the spiral winding period $T_s$. As indicated by arrow 19, the two resonant circuits 10a and 10b are free to move along the length of the support (not shown) in either direction. When an excitation current having frequency $f_1$ is applied to the loop 16, circuit 10a will resonate and will generate a signal in spiral winding 13 dependent upon $\sin[2\pi d/T_s]$, where d is the position of circuit 10a within a spiral period. Similarly, when an excitation current having frequency $f_2$ is applied to the excitation loop 16, circuit 10b will resonate and will generate a signal in spiral winding 13 dependent upon $\sin[2\pi(d+T_s/4)/T_s]$ i.e. $\cos[2\pi d/T_s]$. Therefore, quadrature signals are generated from which the position of the circuit 10a (and therefore circuit 10b) within a spiral period can be determined.

Figure 12A:
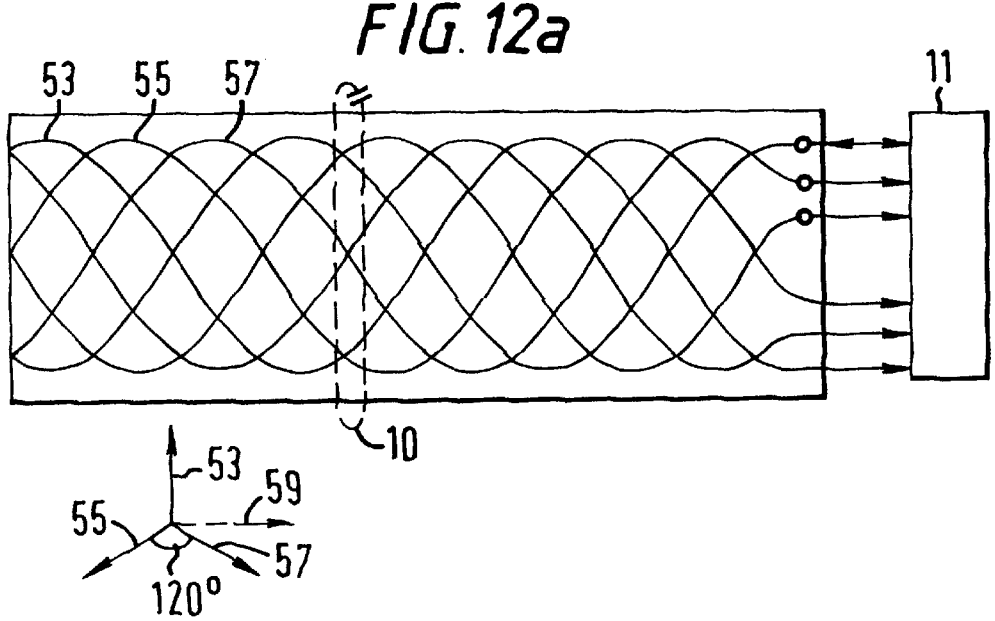
FIGS. 12a and 12b show alternate forms of a three-phase spiral winding together with the associated excitation and processing circuitry, but differing in the way in which energy is applied and the position signal is received.

In the above embodiments, the excitation signal is applied to an excitation loop 16 around the periphery of the support 5. One disadvantage of using such an excitation loop is that it is not balanced and will therefore suffer from and generate electromagnetic interference. FIG. 12a shows a three phase spiral winding system which uses one of the windings to excite the resonant circuit 10 as a result of which the excitation loop is also balanced. In particular, FIG. 12a shows three spiral windings 53, 55 and 57 each 120° out of phase with the other two and a vector representation of the signals induced in the windings by the resonant circuit 10. In this embodiment, winding 53 is used to excite the resonant circuit 10 and the signals on winding 53 and the vector subtraction of the signals on windings 55 and 57 are used to determine the position of the resonant circuit. The vector subtraction of the signals on windings 55 and 57 produce a signal that is in phase quadrature with the signal on winding 53, and is represented in the vector representation by dotted arrow 59. However, in this embodiment, when the resonant circuit 10 is adjacent a crossing point of winding 53 the excitation signal is applied to winding 55 rather than winding 53. Furthermore, the signal on winding 55 and the signal representing the vector subtraction of the signals on windings 53 and 57 are used to determine the position of the resonant circuit. In this way, the system ensures that the resonant circuit 10 is excited for all positions along the support, and ensures that the excitation and receive windings are balanced.

Figure 12B:
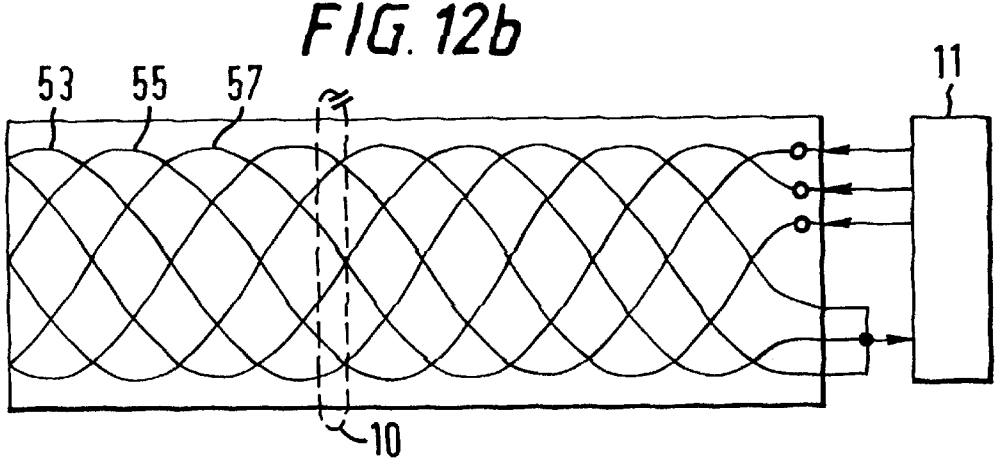

In FIG. 12b three spiral windings 53, 55, 57 are fed at one end with a respective phase of a three phase a.c. exciting current via the excitation and processing unit 11. The windings are connected together at the other end to provide the neutral line of the three phase system, and the signal appearing at the neutral line is returned to the processing unit 11. The resonant circuit 10 unbalances the neutral line and gives rise to a signal whose amplitude depends on the separation of the resonant circuit 10 from the windings 53, 55, 57 and whose phase depends on the position of the circuit 10 within a period of the windings.

FIG. 12c shows yet another configuration that the spiral windings can take. In particular, in FIG. 12c there are four spiral windings 63, 65, 67 and 69 each separated from the other by ⅛ of the period of the windings. As in the other embodiments, an excitation loop 16 is provided around the periphery of the support 5 and the excitation loop 16 and the ends of the spiral windings 63, 65, 67 and 69 are fed into the excitation and processing unit 11. The inventors have established that by using such a four phase system any spatial harmonics produced, generated in the windings are suppressed.

Figure 13A:
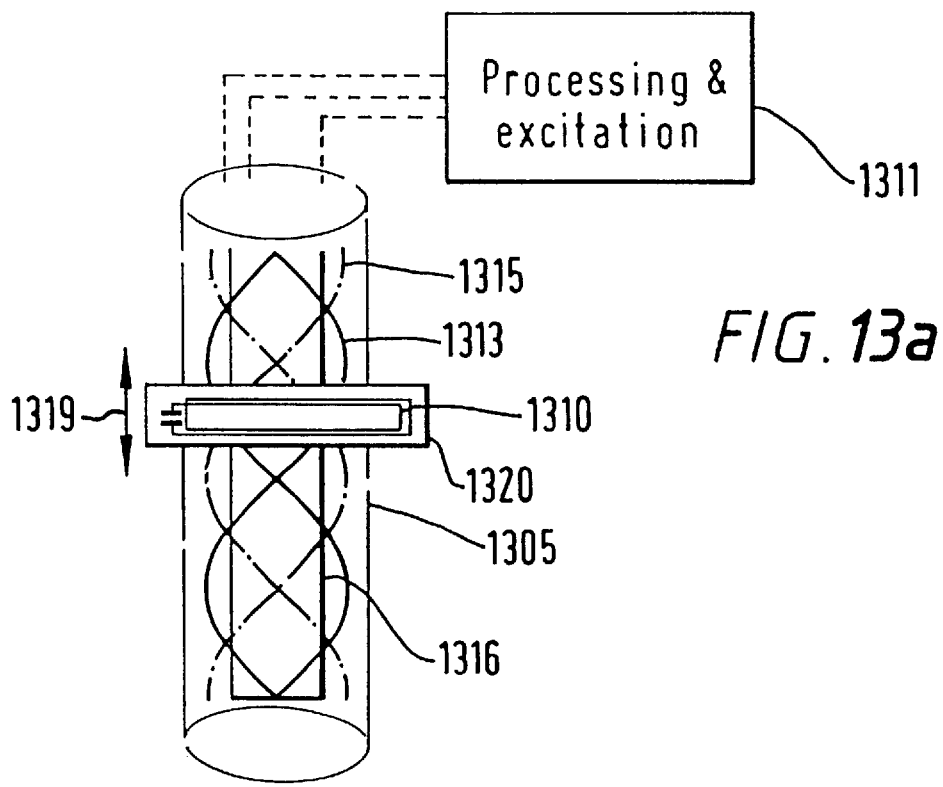
FIG. 13a schematically shows a liquid level sensor embodying the present invention.

In the above embodiments, the spiral windings 13 and 15 essentially lie in a single plane. However, it is also possible to wind the spiral windings around a support in a helical pattern and achieve the same advantages as the flat pattern. This form of the invention is particularly suitable for use in fluid level sensing. FIG. 13a schematically shows a liquid level sensor employing the spiral type windings embodying the present invention. In FIG. 13a, a support 1305 has a cylindrical shape around which the spiral windings 1313 and 1315 are wound in a helical fashion. As those skilled in the art will realise, the support 1305 must be transparent to the magnetic field generated by the resonant circuit 1310, otherwise it will affect the correct operation of the sensor. Also shown in FIG. 13a is the excitation loop 1316 which energises the resonant circuit 1310 mounted on float 1320. Preferably, the float 1320 is torroidal and fits over the support 1305 and windings 1313 and 1315 and can float freely up and down the cylindrical support 1305 as the level of liquid (not shown) rises or falls within the container (not shown) as illustrated by arrow 1319. In this embodiment the float 1320 is also constrained so that it does not rotate about the support 1305. As those skilled in the art will realise, if the float 1320 could rotate then the position indicated by the processing unit 1311 will change for the same height. If a flat spiral had been used along the side of the support 1305 then this rotational problem would not cause the same problem. This problem is discussed in more detail later.

Figure 13B:
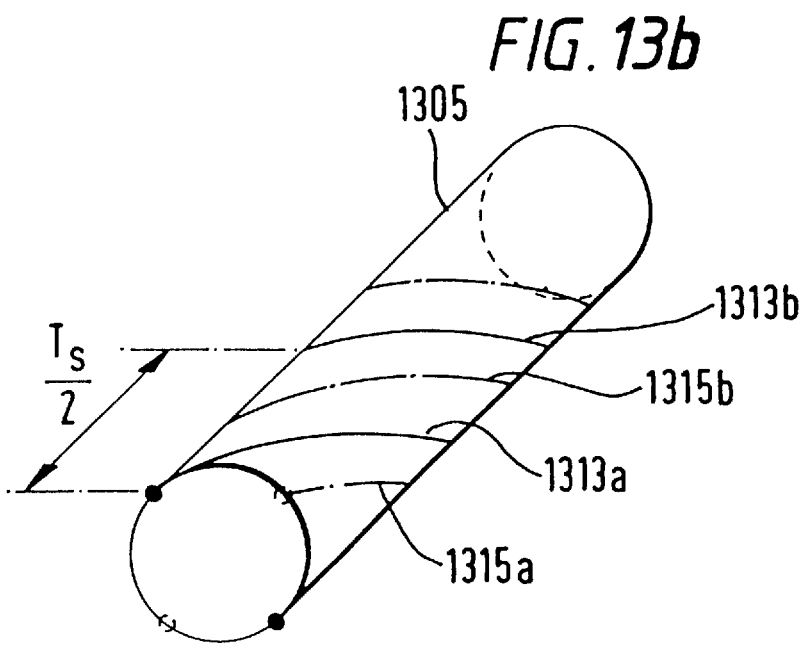
FIG. 13b illustrates how the transducer shown in FIG. 13a can be formed around a support in a helical fashion.

FIG. 13b illustrates how the spiral windings 1313 and 1315 should be wound around the support 1305. Essentially, the spiral windings 1313 and 1315 are formed from four wires 1313a, 1313b and 1315a, 1315b starting on the outside of the support 1305, spaced at 90° intervals, and rotated in a helical pattern along the length of the support 1305. At the far end (not shown) of the support 1305 the wires spaced apart by 180° are connected together, such that wires 1313a and 1313b form one spiral winding 1313 and wires 1315a and 1315b form the second quadrature spiral winding 1315. Additional windings may also be wound around the support 1305 to provide a period encoder when there are a plurality of periods of the spiral windings. The operation of this embodiment is similar to the operation of the first. embodiment. One advantage with this helical design is that it is much easier to manufacture than the flat design since the wires are simply wound around the support.

Figure 14A:
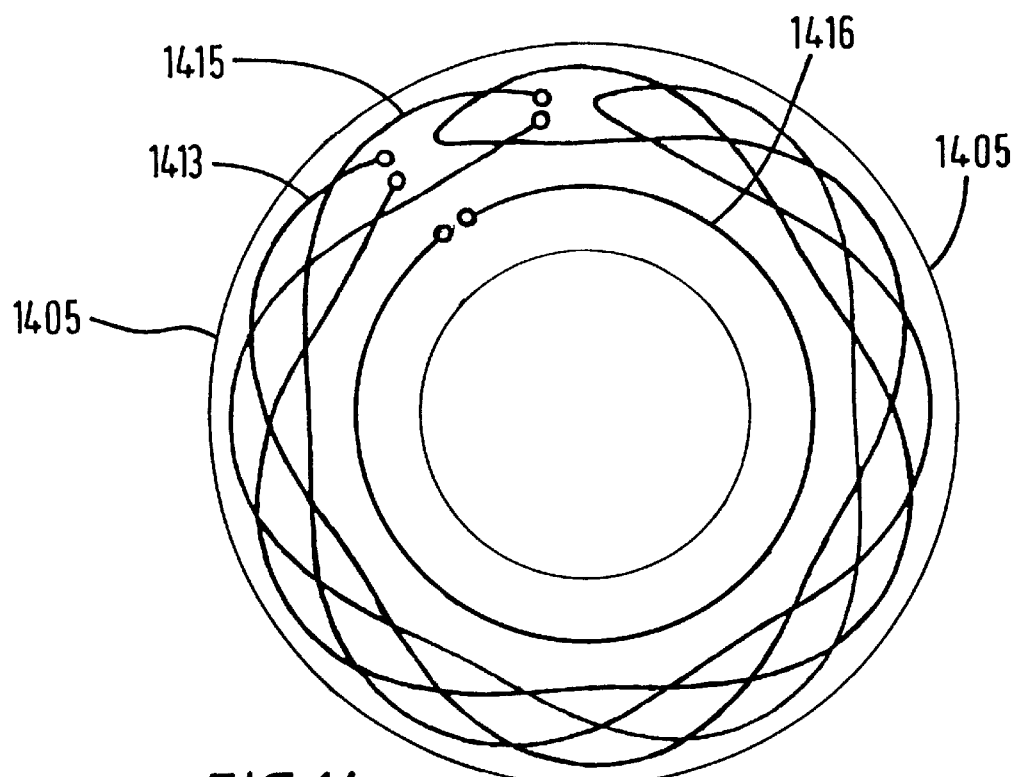
FIG. 14a schematically illustrates a transducer suitable for use in a rotary position encoder embodying the present invention.
Figure 14B:
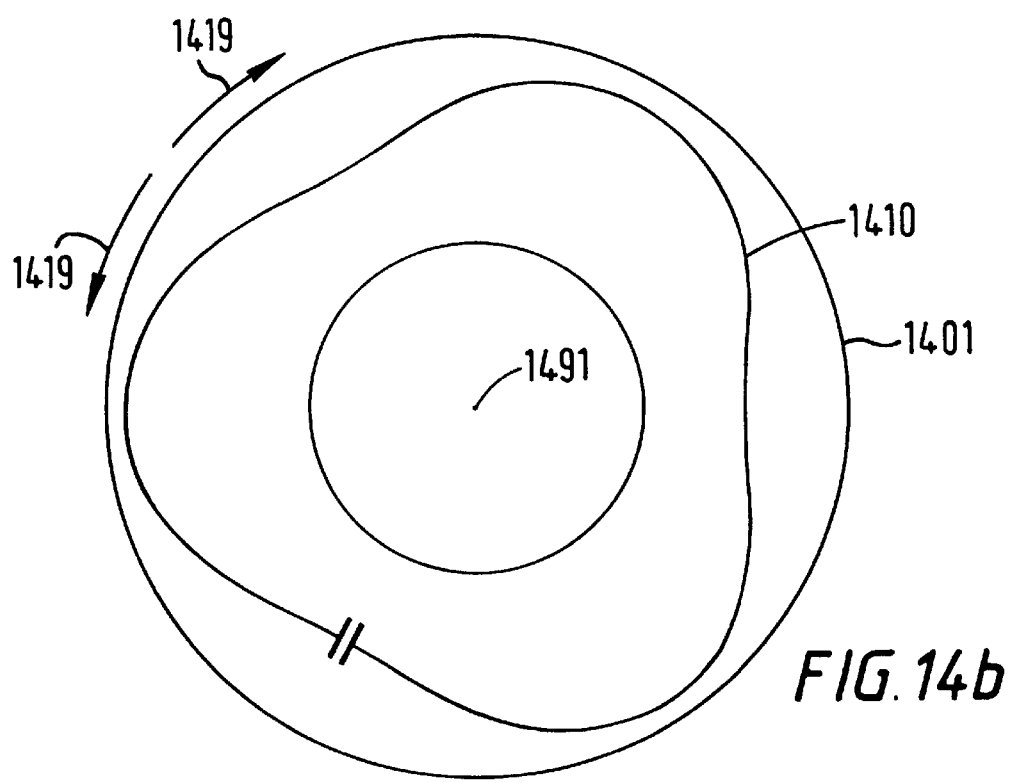

FIGS. 14a and 14b show how the "spiral" transducer can be modified to be suitable for use in a rotary position encoder. In particular, FIG. 14a shows a fixed circular support 1405 upon which spiral windings 1413 and 1415 are wound in a circular fashion. In this embodiment, there are three periods of each spiral winding 1413 and 1415 around a support. As in the linear embodiment, the conductor crossovers are avoided by using vias to the other side of the support or by a using conductor-insulator laminate structure. There is also an excitation loop 1416 mounted on the support 1405 which is used to excite the resonant circuit mounted on the movable element, which will be free to rotate about the axis of the support. To retain linearity in the system, the resonant circuit should be as symmetric as possible.

FIG. 14b shows the rotatable element 1401 which will rotate relative to the support 1405 shown in FIG. 14a about the centre point 1491 as indicated by arrows 1419. Mounted on the rotatable element 1401 there is a resonant circuit 1410 which is designed to maximise linearity of the system. The operation of this rotary embodiment is similar to the operation of the linear embodiments.

Figure 15:
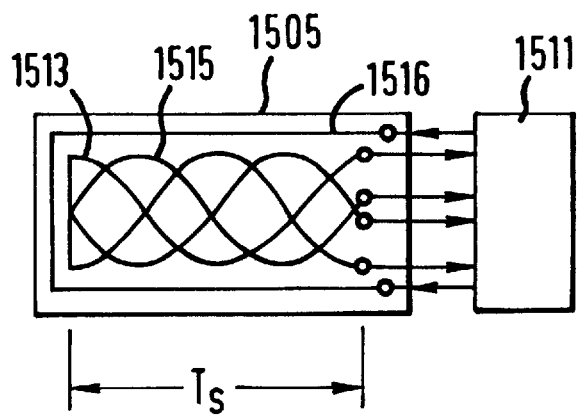
FIG. 15 schematically illustrates a linear position encoder comprising a single period of spiral windings in quadrature.

In the foregoing embodiments multi-period spiral windings were provided along the support of the position encoder. However, in some applications a shorter length support may be sufficient in which case only a single period set of spiral windings needs to be provided. FIG. 15 shows a support 1505 carrying an excitation coil 1516 and two spiral windings 1513 and 1515 in phase quadrature occupying a single period $T_s$. The windings are connected to an excitation and processing unit 1511 as before. Although this form of the device may be suitable for some applications, it is less preferred because end defects reduce accuracy.

Figure 16:
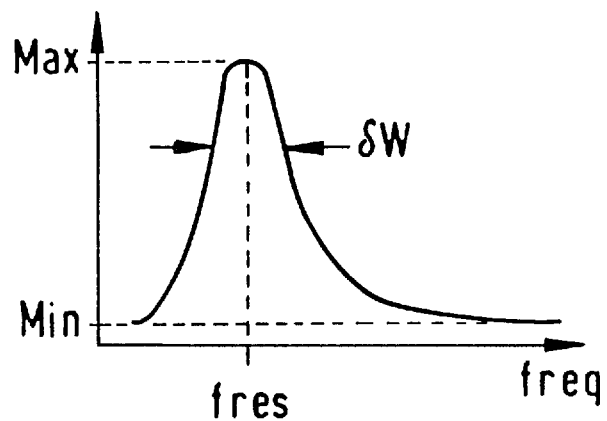
FIG. 16 is a graph of a typical resonance characteristic for a resonant circuit.

In the above embodiments, a resonant circuit was mounted on the movable object. This has the advantage that it still generates a magnetic field after the excitation signal has been removed, which means that no power source is required on the movable object. However, it is equally possible to fix the position of the resonant circuit and allow the support to move. Additionally, it is also possible to determine the position of a plurality of movable objects by employing a resonant circuit having a different resonant frequency in each object. FIG. 16 shows the resonant characteristic of a resonant circuit. Ideally, if the resonant frequencies are to be close together then this characteristic should have a high maximum value, a low minimum value and a narrow peak width δw, or in other words the resonator should have a high quality (Q) factor. One method of improving this characteristic is to employ a quartz or ceramic type resonator in series with the coil 14 and capacitor 17. In such an embodiment, the value of the inductance of the coil 14 and the value of the capacitance of the capacitor 17 are preferably chosen so that their impedance cancel at the resonant frequency of the quartz or ceramic resonator, as this maximises the sharpness of the resonant characteristic. The quartz or ceramic resonators are preferably suitable for surface mounting onto printed circuit boards as this minimises the space required for them. Suitable ceramic resonators are supplied by AVX Kyocera, Stafford House, Station Road, Aldershot, Hants, United Kingdom or Murata, distributed by Cirkit, Mercury House, Calleza Park, Aldermaston, Reading, Berkshire, United Kingdom.

Figure 17:
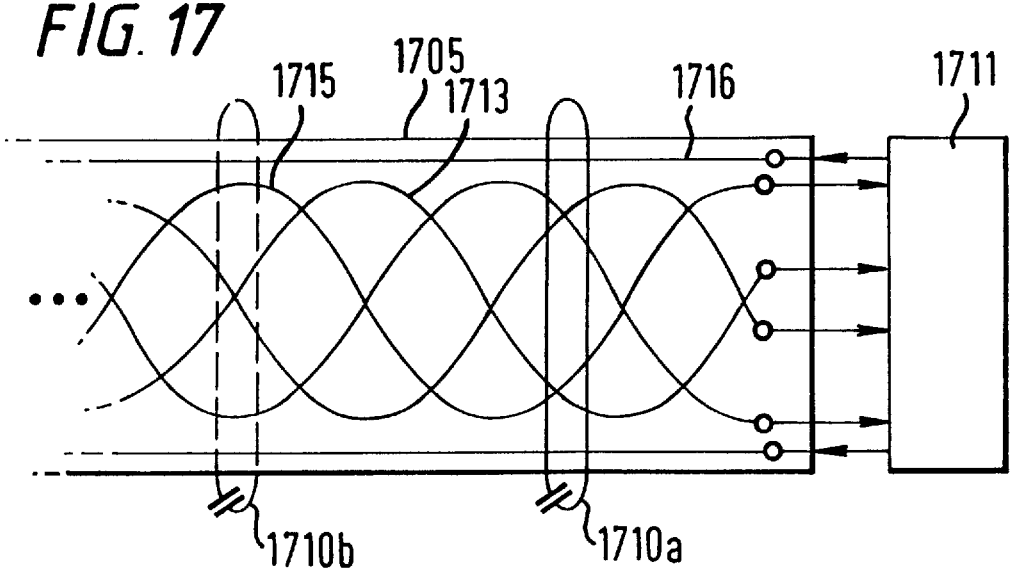
FIGS. 17, 18 and 19 schematically illustrate further forms of a linear position encoder.

In FIG. 17 the arrangement of the support 1705, the excitation coil 1716 and the windings 1715 and 1713 are as before. However, in this embodiment there are two movable objects (not shown) each having a respective resonant circuit 1710A and 1710B having different resonant frequencies. The position of each movable object associated with the respective resonant circuits 1710A and 1710B may be determined by exciting each resonant circuit in turn, or by exciting all the resonant circuits at once using a "white-noise" signal, i.e. a signal containing all frequencies, and using well known signal processing techniques to determine the position of each movable object. Although the resonant frequencies associated with each object can have any value, they are preferably chosen to be relatively close together so that the bandwidth of the system is not too large. Otherwise, the electronics will become complex and hence more expensive.

Figure 18:
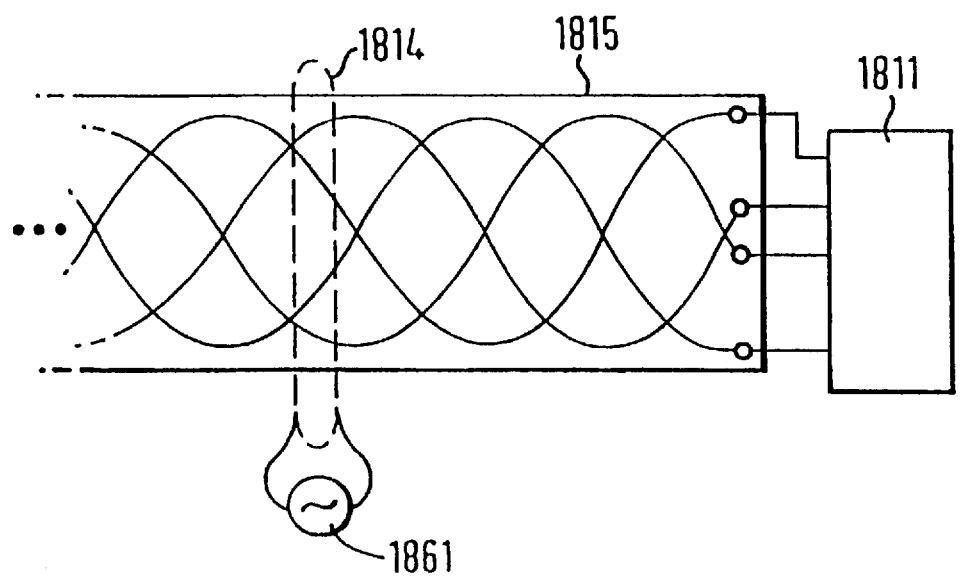

Of course, if there is no problem in having a power source on the movable object, then the capacitor 17 that forms part of the resonant circuit 10 may be replaced with a power source. Such an embodiment is illustrated with respect to the flat spiral design in FIG. 18, but is equally applicable to the other embodiments. In particular, FIG. 18 schematically shows a set of flat quadrature spiral windings 1813 and 1815 which are mounted on a support 1805, and a coil 1814 mounted on the movable object (not shown) with an a.c. power source 1861 connected to the ends of the coil 1814. The embodiment shown in FIG. 18 can easily be adapted for use in a multi-object system. In such an adaptation, each object would have its own power source having a particular frequency.

In the above embodiments, signals on the spiral windings are only processed after the excitation signal has been removed. The reason for this is to reduce the interference caused by the cross-coupling with the excitation signal. However, if a harmonic generator is used instead of the resonant circuit, then it is possible to distinguish the signals generated by the harmonic generator from the excitation signal. Therefore, if a separate excitation coil is provided, then it will be possible to determine the position of the harmonic generator while the excitation signal is still being applied to the excitation coil. This is possible since the harmonic generator has a non-linear magnetic characteristic which produces, in response to an excitation signal, a magnetic field with components including harmonics of the excitation frequency. These higher frequency harmonics can be distinguished from the excitation signal and can therefore be used to determine the position of the harmonic generator while the excitation signal is still being applied to the excitation coil.

Figure 19:
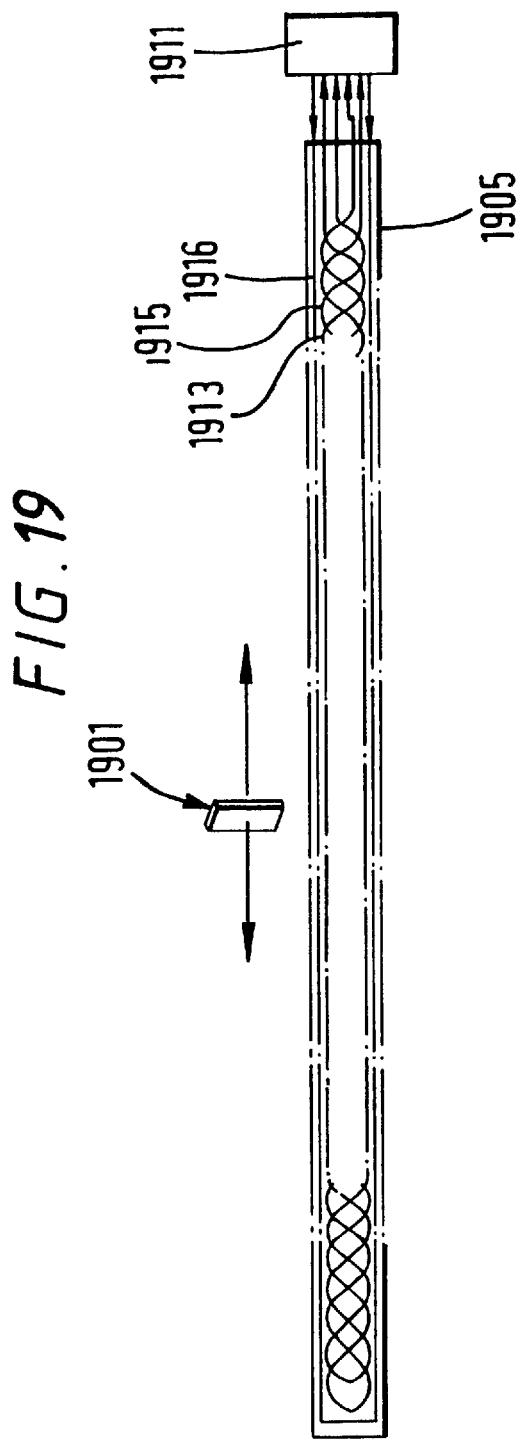

FIG. 19 shows an embodiment where a harmonic generator 1901 is mounted on the movable element (not shown) instead of a resonant circuit. This embodiment is described with reference to a flat spiral design, but is also applicable to the other embodiments described above. FIG. 19 shows a support 1905 upon which spiral windings 1913 and 1915 and an excitation loop 1916 are mounted. The excitation loop 1916 must be able to excite the harmonic generator 1901 into its non-linear region when it is in any of its allowed positions, i.e. along the whole length of the support 1905. The excitation loop 1916 mounted around the periphery of the support 1905 shown in FIG. 17 is one example of an appropriate excitation loop.

Figure 20:
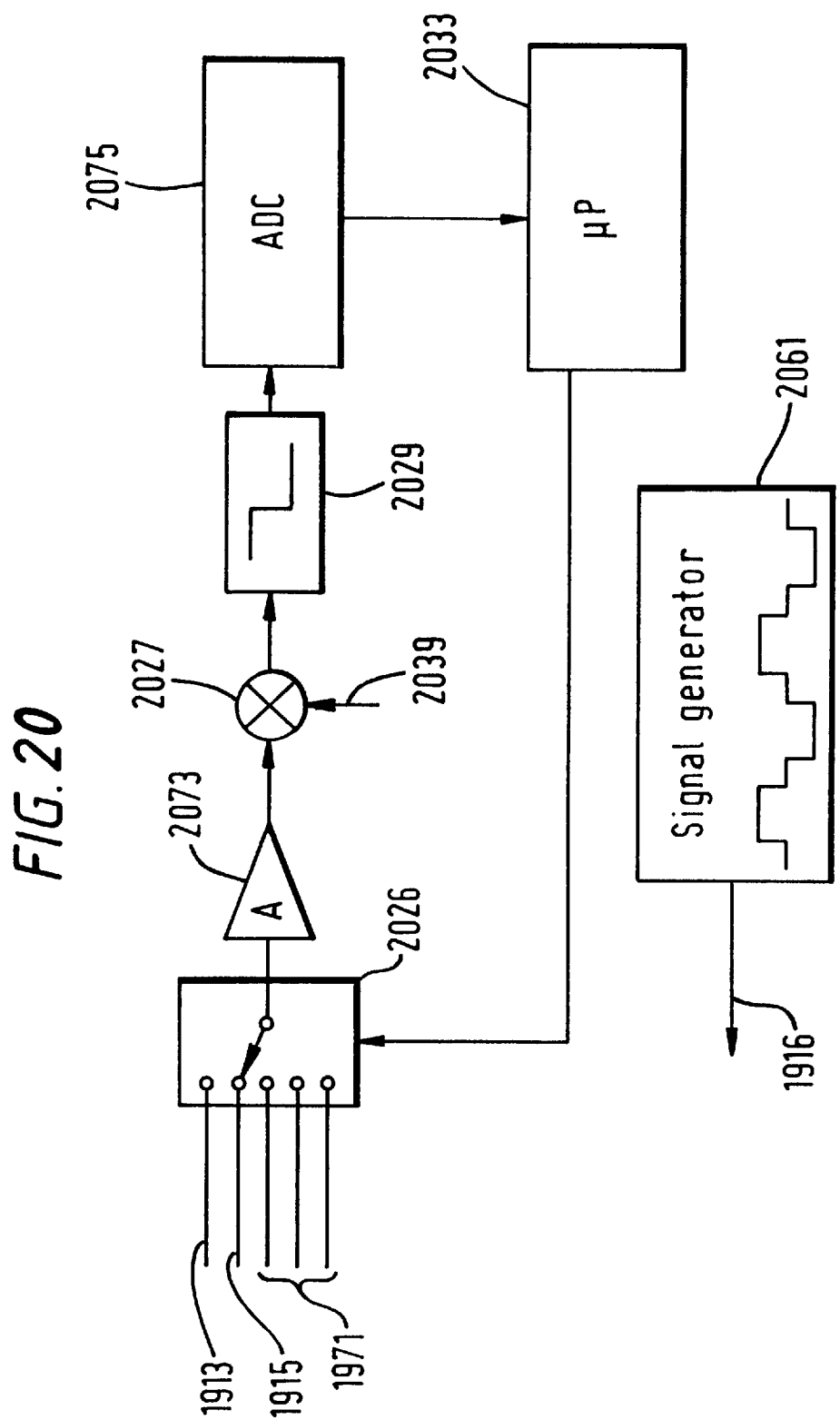
FIG. 20 is a schematic representation of preferred excitation and processing circuitry used to determine for the position encoder shown in FIG. 19, the position of the harmonic generator.

FIG. 20 shows an example of the signal generator that generates the excitation signal, and the processing circuitry in the excitation and processing block 1911 shown in FIG. 19. In particular, a pseudo-square wave generator 2063 generates an excitation signal having a fundamental frequency f but with no 3f, 9f, 15f etc. harmonics which is continuously applied to the excitation loop 1916. The signals from the quadrature spiral windings 1913 and 1915, (and from other windings 1971 if absolute position is required) are fed into an analog multiplexer 2026 controlled by microprocessor 2033. The signal from each winding is amplified by amplifier 2073 and mixed in mixer 2027 with a signal 2039 whose frequency is three times the frequency of the fundamental frequency f of the excitation signal, i.e. the third harmonic. Therefore, the component of the received signal having frequency 3f (which is the component of interest generated by the harmonic generator 2001) will be demodulated, whereas the other components will not be. The demodulated component is then removed from the high frequency components by the low pass filter 2029, converted into a digital signal in ADC 2075 and fed into microprocessor 2033 where it is temporarily stored. Once the signals from all the windings have been processed in this manner, the microprocessor 2033 calculates the absolute position of the movable object using equation 14 above.

The harmonic generator 1901 is typically made from a non-linear magnetic material which can be driven past its saturation point into its non-linear region by the excitation signal, e.g. Vaccum Schmeltze 6025 Spinmelt Ribbon. Alternatively, a coil connected to a non-linear electrical element such as a diode may also be a suitable harmonic generator 1901 (in which case the processing circuitry would be tuned to the second harmonic of the excitation signal).

A problem with the harmonic generator embodiment described above, is that the presence of other ferrous materials within the system may also generate background harmonic signals. However, this distortion may be minimised by (i) reducing the coercivity and permeability of the harmonic generator 1901 so that it generates harmonics at lower transmitter field levels than the surrounding ferrous materials, e.g. well below 50 A/m; and/or (ii) using materials with a sharp saturation point so that high levels of high frequency harmonics may be measured which are not typically encountered in ferrous materials. Suitable materials which have these features are long, thin spin melt amorphous metals, (Metglass) supplied by Allied Signal of 6 Eastmans Road, Persippany N.J. 07054, New Jersey, USA; and sputtered magnetic materials such as nickel alloys. Additionally, the shape factor of the material should be high to enable high permeability to be achieved. This may be achieved using long, thin samples or very thin flat samples.

Magnetic materials excited to the non-linear region with a single frequency a.c. field with no direct current (d.c.) component produce odd harmonics of the drive current. However, if materials of very low permeability are employed then the earth's field may be sufficient to degrade odd harmonic generation by biassing the harmonic generator out of the non-linear region. A possible solution is for the system to apply a d.c. bias field to counteract the earth's field. The required d.c. bias may be determined by minimising the detected level of even harmonics or maximising the detected level of odd harmonics.

Another possibility with using a harmonic generator is exciting it with two different excitation frequencies $F_1$ and $F_2$. In such an embodiment, the harmonic generator will generate a magnetic field having intermodulation components, i.e. components at $F_1 \pm F_2$.

The harmonic generator embodiment is highly suited to measuring the position of a float, since it is highly resistant to dirt, salt water etc which may cause electrical damping of an inductor/capacitor resonator, and can operate with large gaps between the float and the support. Furthermore, the harmonic generator has the advantage over the resonant circuit that it will couple with the spiral windings regardless of its orientation. This is true even when the harmonic generator consists of amorphous metal that has a preferred magnetic axis, since it is possible to layer the material in alternate orientations thereby obtaining a suitably isotropic device.

Another, more complex, alternative to the resonant circuit is an electronic transponder powered by the magnetic field generated by the transmit coil which generates a signal or code that can be distinguished from the excitation signal. This embodiment offers increased user flexibility at the expense of greater system complexity and cost.

Other simpler alternatives exist that could work instead of the resonant circuit. For example a piece of magnetic material which concentrates the a.c. magnetic field generated by the excitation coil, for example ferrite, or a conductor which distorts the a.c. magnetic field generated by the excitation coil, for example a sheet of aluminum. However, these embodiments do not allow the position of more than one movable element to be detected.

In the embodiments where a resonant circuit is used, its shape, mass, resonant frequency etc. will be dictated by the particular application and will also dictate to some extent the accuracy of the system. The inventors have established that a high degree of accuracy is achieved when the diameter of the coil that forms part of the resonant circuit is approximately twice the width of the spiral windings and approximately equal to half the period of the spiral windings.

Figure 21:
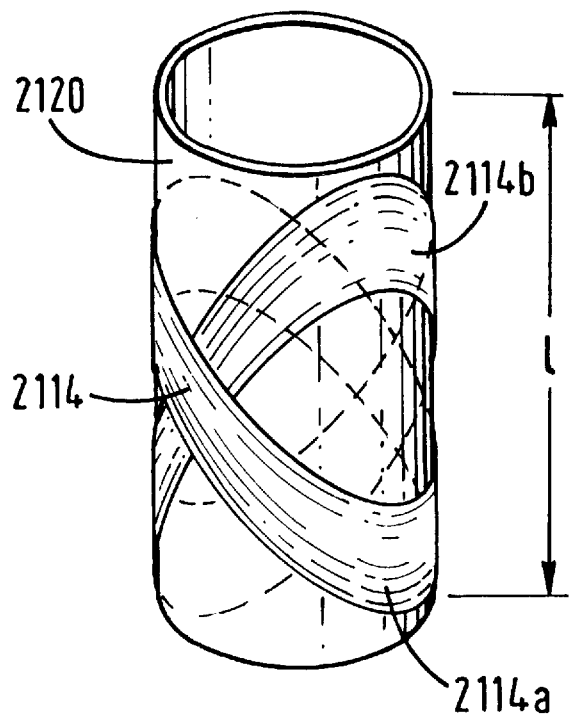
FIG. 21 is an isometric view of a preferred float arrangement used in the liquid level sensor system shown in FIG. 13.

FIG. 21 is an isometric view of an air-cored resonator design. that is appropriate for the float resonator shown in FIG. 13a. The float 2120 is a tube of non-magnetic preferably non-conducting material, for example plastic or glass, has length l and has an inside diameter large enough to fit over the support 1305 and spiral windings 1313 and 1315 shown in FIG. 13a. A coil of wire 2114 is wound around the outside of the float 2120 in such a manner that its magnetic axis is directed radially with respect to the float 2120. In this embodiment this is achieved by winding a first portion 2114a of the coil 2114 around the float in a first plane set at a first angle to the plane of the tubing itself, and then winding a second portion 2114b of the coil 2114 around the float 2120 in a second different plane set at a second angle to the plane of the tubing itself such that the combined effect of the two portions 2114a and 2114b of the coil 2114 results in a coil having a radial axis. A capacitor (not shown) will be connected to the two ends of coil 2114 to form a resonant circuit with the coil 2114.

Figure 22:
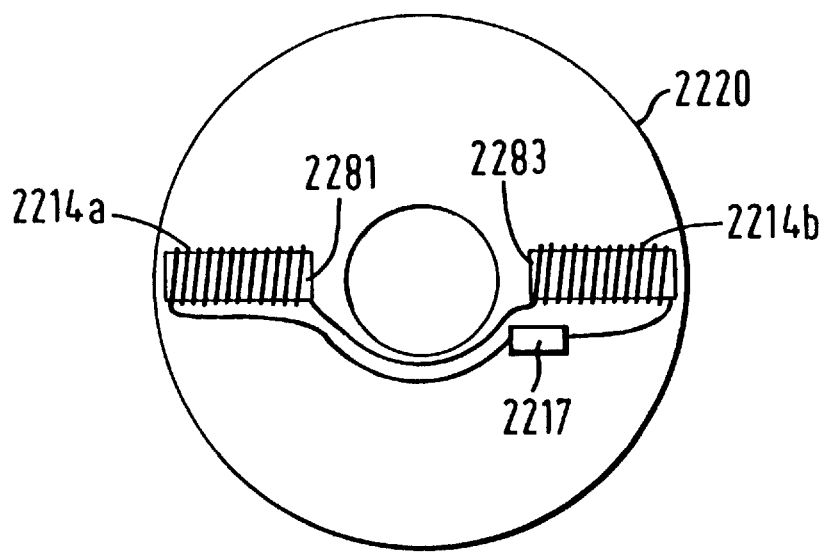

In some applications however a low float length l will be a prerequisite. In such an embodiment, the design shown in FIG. 21 will not be appropriate, and an alternate design like the one shown in FIG. 22 will be required. In particular, FIG. 22 shows in plan a flat disc-like float 2220 again having an inside diameter large enough to fit over the support 1305 and spiral windings 1313 and 1315 shown in FIG. 13a. Two portions 2214a and 2214b of a coil 2214 are mounted on the float 2220 in the manner shown such that the axis of the coil 2214 is radial with respect to the float 2220. The ends of the coil 2214 are connected to a capacitor 2217 thereby forming a resonant circuit. The coil portions 2214a and 2214b are preferably wound around ferrite rods 2281 and 2283 as this concentrates the magnetic field produced by the coil 2214 when the resonant circuit is resonating.

In the above embodiments, the axis of the resonant circuit was assumed to be fixed. However, in some applications, such as fluid flow meters, the resonant circuit may rotate. FIG. 23 shows how one form of the transducer of the present invention can be used in a fluid flow rate sensor. Fluid is passed upwardly through a vertical pipe 2385 made of non-magnetic preferably non-conducting material that is internally tapered as shown. The vertical position taken up by a float 2320 depends upon the rate of fluid flow. FIG. 24a shows in more detail the float 2320 shown in FIG. 23. Within the float 2320 there is a resonant circuit 2410 whose axis is horizontal. However, the float 2320 which in this instance is generally conical tends to rotate in the fluid flow, so that the axis 2421 of the resonant circuit 2410 will change. Accordingly the signal from the transducer will for a given height vary with time. In the present embodiment, the float 2320 remains vertical due to its generally conical shape and it only rotates about its vertical axis. When the circuit 2410 is resonating and when the float is rotating, the EMF induced in both spiral windings on the transducer will be amplitude modulated by cos θ where θ is the angular orientation of the float and is zero when the axis 2421 of the circuit 2410 is perpendicular to the surface of the support 2305. However, the effect of the rotation on the induced signals can be removed by the ratiometric calculation performed in equation 13 above since the EMF induced in both spiral windings is affected by the same modulation. Therefore, the rotation of the float 2320 about a vertical axis will not hinder the determination of its vertical position. However, if for any reason the float stops rotating when the axis of the resonant circuit is orthogonal to the surface of the support 2305, i.e. when θ=90° or 270°, then the height cannot be determined since there is no longer any coupling between the resonant circuit 2410 and the spiral windings(not shown).

FIG. 24b shows how the float 2320 shown in FIG. 24a may be modified to solve the above problem. In FIG. 24b the float 2320 has resonant circuits 2410a and 2410b having horizontal but perpendicular axis and each preferably having a different resonant frequency $f_1$ and $f_2$. Therefore, in this embodiment, there will always be an output signal in the spiral windings (not shown) due to the magnetic field from at least one of the resonant circuits, from which the height of the float can be determined regardless of the angular orientation thereof.

Additionally, as those skilled in the art will realise, it is also possible to determine the angular orientation θ of the float 2220 from the signals generated in any of the spiral windings. This will be evident to those skilled in the art since the signal induced in one spiral winding due to one resonant circuit (after demodulation and filtering) is given by:

$$\tilde{V}^{f1} = S(x,y) \cos \theta \qquad (18)$$

and the signal induced in the same spiral winding due to the other resonant circuit (after demodulation and filtering) is be given by:

$$\tilde{V}^{f2} = S(x,y) \sin \theta \qquad (19)$$

Therefore, the angular orientation θ can be calculated from an inverse tangent function of the ratio $\tilde{V}^{f2}/\tilde{V}^{f1}$. Furthermore, the rotation rate of the float can also be determined by tracking θ as it changes. This is advantageous since the rotation rate also depends on the fluid flow rate.

FIG. 24c shows in cross-section an alternative solution to this problem. In particular, FIG. 24c shows the pipe 2385 through which the fluid flows, the float 2320 within the pipe 2385 and two supports 2405a and 2405b lying in orthogonal planes adjacent to the pipe 2385, each having a set of spiral windings (not shown) mounted thereon. In this embodiment, only a single horizontal axis resonant circuit (not shown) is mounted in the float 2320. As those skilled in the art will realise, there will always be an output signal from the spiral windings on at least one of the supports, and therefore the height of the float can always be determined regardless of the angular orientation thereof. As in the embodiment shown in FIG. 24b, it will also be possible to determine the angular orientation of the float 2320 as well. However, as those skilled in the art will realise, in this embodiment signals from the two supports 2405a and 2405b will have to be used to determine the angular orientation.

In the above embodiments describing a fluid flow rate sensor, the float was specially designed to rotate only about a vertical axis. FIG. 24d shows another embodiment of a fluid flow rate sensor where the float 2420 is spherical, and can therefore rotate about any axis. In this embodiment, a single set of spiral windings (not shown) are mounted on a support 2305 adjacent the pipe 2385. The float 2420 is free to float within the pipe 2385 which is tapered as before, and it contains three resonant circuits 2410a, 2410b and 2410c having orthogonal axes and preferably having different resonant frequencies. In this embodiment, there will always be some coupling between at least one of the resonant circuits 2410a, 2410b or 2410c within the float 2420 and the set of spiral windings (not shown). Therefore, the height of the float 2420 can always be determined irrespective of its angular orientation. Furthermore, it may also be possible to determine the rotation rate of the float 2420 about its axes since the signals induced in the spiral windings (not shown) at the three resonant frequencies will depend upon the rotation rate of the float 2420 about the axis of the corresponding resonant circuit.

One of the major advantages of the spiral sensing system over existing fluid flow rate sensors (which use a magnetic float and a magnetic tracking device) is that it does not exert any force on the float. Therefore, the system is more accurate than the existing fluid flow rate sensing systems. Furthermore, by measuring both float height and rotation rate there is a increased dynamic range over which accurate flow indication is possible.

In the embodiment illustrated in FIG. 13*a* it was assumed that the float 1320 could not rotate about a vertical axis. However, if the float 1320 can rotate, then to ensure that the resonant circuit will always be excited irrespective of the angular orientation of the float, either two orthogonal excitation coils and one horizontal axis resonator has to be provided or a single excitation coil and two horizontal but orthogonal axes resonant circuits must be provided so that the angular orientation of the float can be determined. The angular orientation of the float must be determined so that a suitable correction of the indicated position can be made.

FIG. 25 illustrates how two orthogonal excitation loops 2516*a* and 2516*b* can be mounted around the support 1305 used in the liquid level sensing system shown in FIG. 13*a*. The two excitation coils 2516*a* and 2516*b* need not lie in orthogonal planes but it is preferred since it simplifies the processing required to determine the position and angular orientation of the float 13 shown in FIG. 13*a*.

Figure 26A:
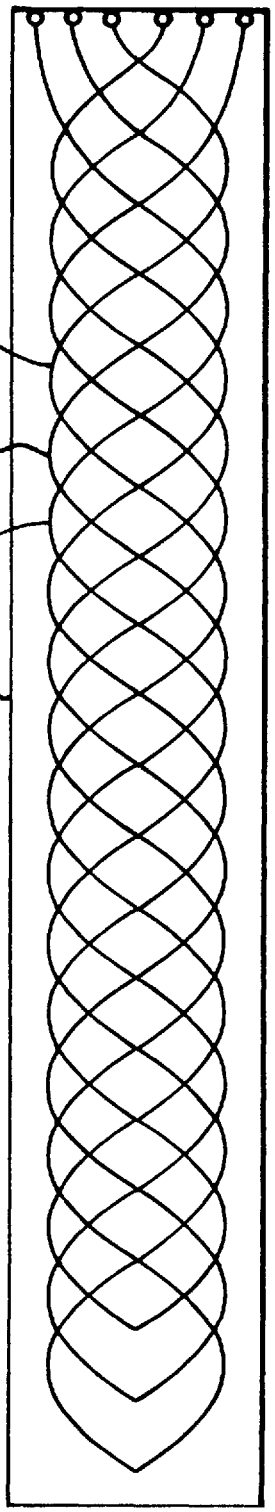
FIGS. 26a and 26b are respectively views of a position encoder track and balanced resonator coils according to another embodiment of the invention.
Figure 26B:
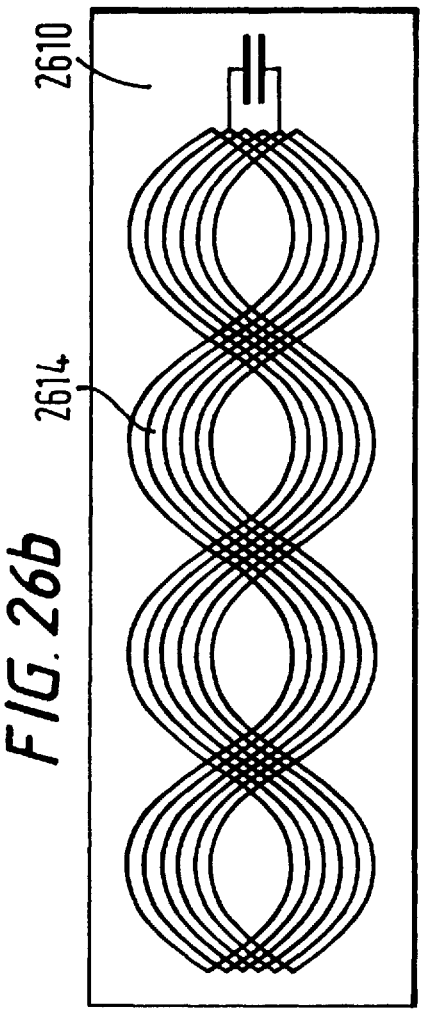

FIGS. 26*a* and 26*b* show a further form of the windings and resonant circuit. In FIG. 26*a* a support 2605 carries windings 2653, 2655 and 2657 disposed in a three phase arrangement. The associated resonant circuit 2610 shows coils 2614 disposed in a spiral arrangement so as to form a balanced resonant circuit with a multiplicity of loops extending along the measurement direction. This multi-loop arrangement has the advantage of averaging the signal over a number of windings and thereby minimising errors due to defects in the manufacture of the windings 2653, 2655 and 2657.

Figure 27:
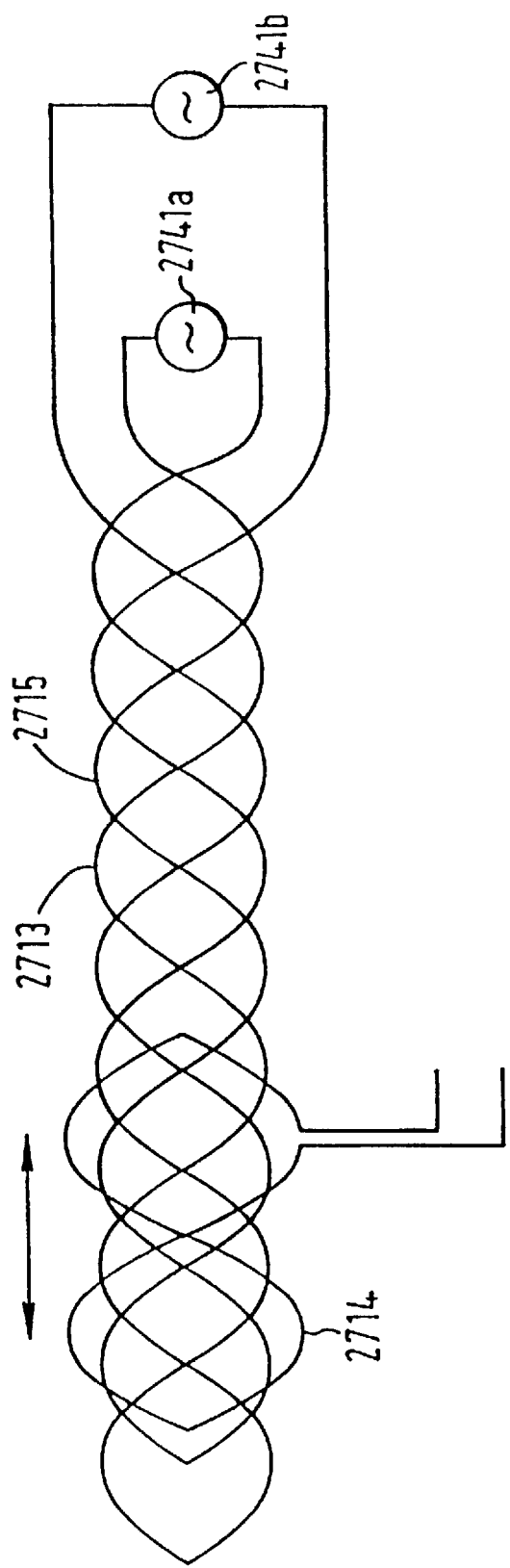
FIG. 27 is a diagrammatic view of balanced transmitter and position encoder tracks in quadrature together with a balanced pick up coil.

In FIG. 27 there is shown a transmitter track formed by spiral windings 2713 and 2715 which are fed with a.c. signals as shown which are in quadrature relationship. A spiral pick-up coil or receiver 2714 receives a signal whose magnitude is dependent on position along the transmitter track within a pattern of convolutions. The spiral arrangement for the receiver coil 2714 is preferred because it provides an average signal reducing the effects of any manufacturing defects in the transmitter windings 2713 and 2715. However, a single receiver coil could be used instead if desired. The a.c. sources 2741*a* and 2741*b* provide the phase quadrature signals that are applied to the windings 2713 and 2715 as mentioned above, and are operated alternately so that a succession of sine and cosine signals are received at the receiver 2714.

FIG. 28 shows one of the windings that would be used in a two dimensional position encoder employing the spiral windings embodying the present invention. In particular, FIG. 28 shows a spiral winding 2815 whose density of coils varies in a sinusoidal manner along the x axis of FIG. 28. As a result, the sensitivity of winding 2815 to a near source of magnetic field will vary in a sinusoidal, manner with distance x. A phase quadrature spiral winding (not shown) will also be required whose density of coils varies in a sinusoidal manner with distance along the x axis. This provides a one dimensional linear displacement device. However, if a further set of phase quadrature windings are provided superimposed over the winding 2815 and the corresponding quadrature winding (not shown), whose winding densities vary in a sinusoidal manner per unit distance in the y direction, then a two dimensional transducer is provided. For clarity, in FIG. 28 some of the windings are not shown. FIG. 28 also shows a resonant circuit 2810 whose position can vary in the x and y direction. If an excitation coil (not shown) is provided to excite the resonator 2810 then the position of the resonator in the x and y direction with respect to the origin O can be determined from the signals induced in the four spiral windings in the manner described above.

Figure 29A:
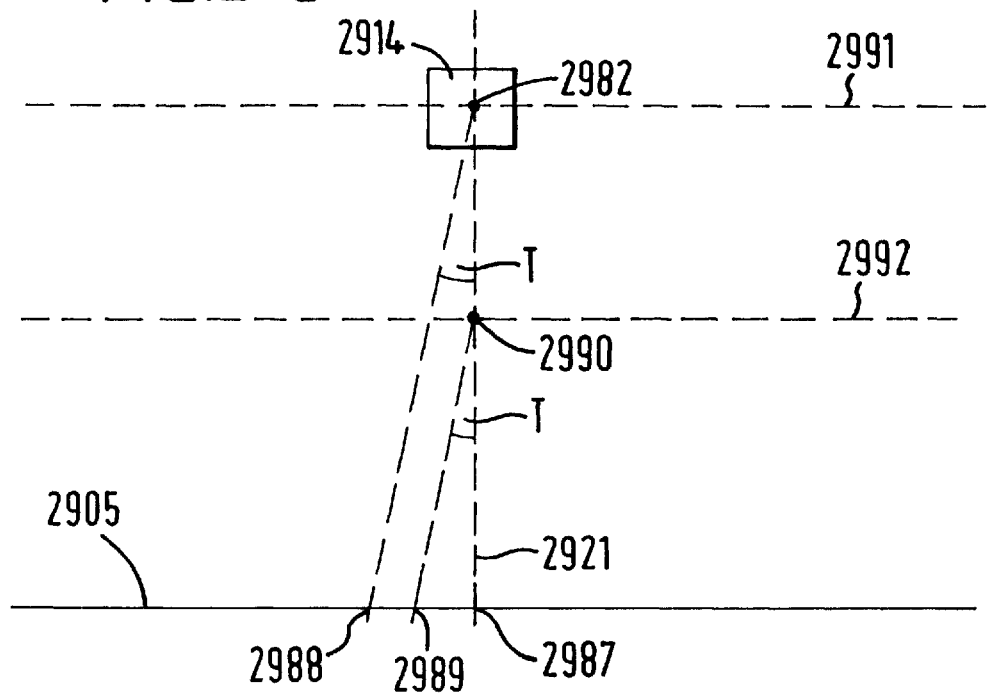
FIGS. 29a and 29b are diagrams showing the relationship between an apparent measurement position and a real measurement position for a single coil, and the use of a pair of coils to adjust the apparent measurement position, permitting reduction of the adverse effects of coil tilt.

The inventors have also established that by careful design of the resonant circuit, it is possible to reduce (within limits) the apparent effect of resonant circuit tilt. FIG. 29*a* schematically shows a coil of wire 2914 having axis 2921 that forms part of the resonant circuit that is mounted on the movable member (not shown). FIG. 29*a* also shows the support 2905 upon which the spiral windings (not shown) are mounted. The system is designed to output the position of the resonant circuit along the length of the support. If the resonant circuit tilts, i.e. the axis 2921 of the resonant circuit is displaced through T radians, the position encoder should output the position as being at point 2988. However, through experimentation the inventors have established that this is not the case. In fact the position encoder indicates that the resonant circuit is adjacent point 2989 which is approximately halfway between the actual position 2987 and the expected position 2988. This means that the resonant circuit appears to be at point 2990 and appears to move along an apparent measurement plane 2992 which is different from the actual plane 2991 in which the resonant circuit lies. Furthermore, the inventors have discovered that by using a resonant circuit comprising two coil portions connected in series and spatially separated along the measurement direction it is possible to move the apparent plane of measurement 2992 away or towards the support 2905. This has important implications in applications such as ink jet printer head position sensing where it may be impossible to place the coils in the required measurement plane because of space restrictions.

Figure 29B:
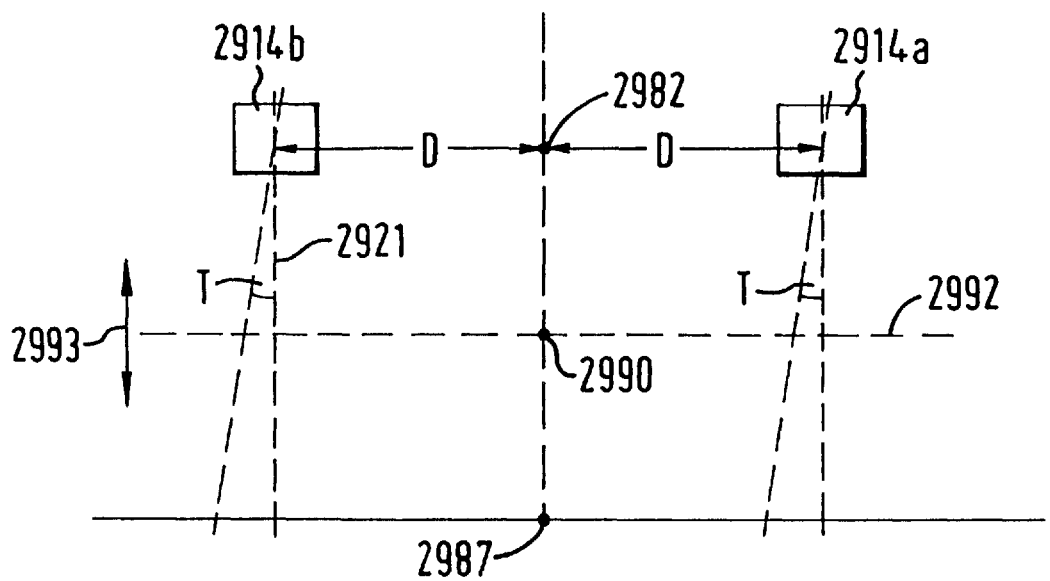

FIG. 29*b* shows an embodiment where the resonator comprises two electrically connected coils and where the distance between the respective axis 2921 is 2D. The two coils are fixed to the movable object such that if the movable object tilts then the two resonant circuits will tilt about point 2982. The inventors have established that they can vary the apparent plane of measurement 2992 as illustrated by arrow 2993 by changing the distance 2D between the coils 2914*a* and 2914*b*. Preferably, the distance between the two coils is not an exact multiple of the winding period. In one experiment, (i) each coil portion 2914*a* and 2914*b* comprised forty turns of 0.2 mm copper wire wound around a ferrite bobbin having 8 mm square section and 18 mm length; (ii) a suitable capacitor was chosen to make the resonant circuit resonate at 150 KHz; (ii) an actual separation of 25 mm between the centre of the coils and the surface of the support 2905 was chosen; (iv) a spiral period of 50 mm pitch and 20 mm peak to peak was used; and (v) a separation between the coils (i.e. 2D) of 116 mm was used. The results obtained show that the effective plane of measurement 2992 was located 120 mm above the track and the position indicated by the position encoder system is point 2987 to within ±0.4 mm with angular changes of upto ±4°.

For the same angular changes and a single coil, the position encoder indicates point 2987 to within ±8 mm. This represents an accuracy improvement of a factor 20. In a second experiment with a similar set up, but with a separation (2D) between the coils of 100 mm the apparent plane of the measurement 2992 system was found to be 10 mm above the track. In a third experiment with a similar set up but with a separation (2D) of 96 mm the apparent plane of measurement 2992, was found to be on the surface of the support 2905. Therefore, in an ink jet printer application where the nozzle from which ink is projected on to the paper is liable to tilt, it would be advantageous if the apparent plane of measurement were to be made equal to the plane of the paper. This may be achieved by selecting a suitable separation D. With this arrangement, the accuracy of the system is increased since on the apparent plane of measurement the position does not change much for small changes in tilt.

Figure 30A:
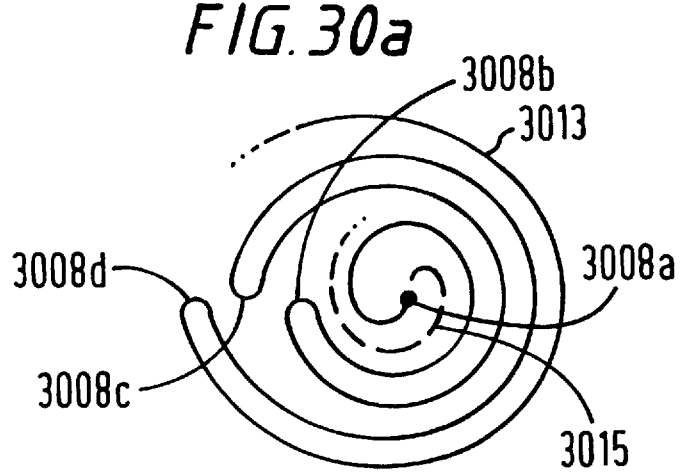
FIGS. 30a and 30b are views of alternative forms of a radial position transducer.

FIG. 30*a* shows one way in which the spiral windings shown in FIG. 2 may be modified to produce a transducer suitable for use in a radius encoder. In particular, FIG. 30*a* shows a winding 3013 that starts at point 3008*a* and winds in a clockwise spiral until point 3008*b* where it changes direction and winds in the reverse direction until point 3008*c* where it changes again etc. Therefore, with this configuration the winding 3013 has a sinusoidal magnetic sensitivity function that varies as a function of radius. In other words, the winding has a "multipole" magnetic detection pattern in any radial direction. A second quadrature spiral winding 3015 will also be required but only the start of it is shown for clarity. The operation of this embodiment is similar to the operation of the linear embodiments and will not be described again.

Figure 30B:
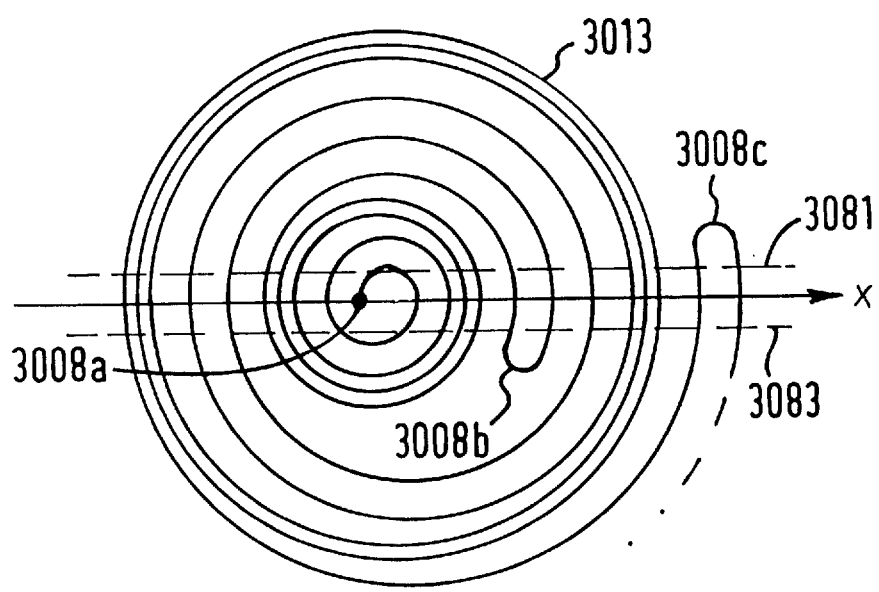

FIG. 30*b* shows a modification of the spiral transducer system shown in FIG. 30*a*. In particular, in the arrangement of FIG. 30*b* each part of a winding completes several revolutions before changing direction. Furthermore, the winding density of the windings between the change in directions is made to vary such that the. magnetic sensitivity of the winding is sinusoidal in any radial direction.

Figure 31:
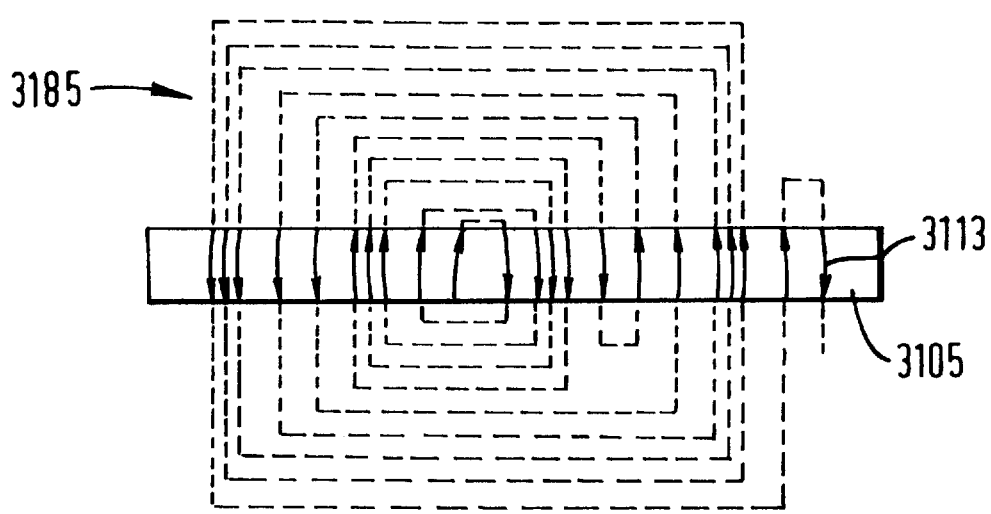
FIG. 31 shows a modified form of the transducer shown in FIG. 30b that is suitable for use in a linear position encoder.

If the movable element can only move along the x-axis shown in FIG. 30*b* then only a linear encoder is required. In such an embodiment, it is possible to modify the windings by notionally cutting them along the dotted lines 3081 and 3083 and connecting corresponding parts of the windings that are left. FIG. 31 shows the resulting winding pattern if this is done. In particular, the winding density of the winding 3113 varies in a sinusoidal fashion with distance along the length of the support 3105. The dotted lines generally indicated by reference numeral 3185 represent the connections to corresponding parts of the winding. There will also be a quadrature winding, but for clarity this is not shown.

The transducer of the present invention may be applied to a number of applications. The embodiments have already described use of the transducer in applications such as lift position control, liquid level detection and fluid flow rate detection. Other applications include valve position sensing, positioning of the print head in a printer, graphic pen input devices, cranes, throttle rotation sensor, ABS rotation sensors, shock absorber/ride height sensors and warehouse position sensing tracks.

Additionally, the spiral winding transducer may also be used in other encoder systems, for example in a Hall effect measurement head. In such a system the head reads a d.c. magnetic scale to indicate position. However if sine and quadrature tracks are used, and further tracks if absolute position is to be determined, then multiple read heads must be provided. A lower degree of symmetry is thus achieved and with the system using the spiral transducer, and at a higher cost. Lower symmetry means that the ultimate performance is not so good. Additionally, Hall sensors also have inherent offsets which are awkward to compensate for in d.c. systems. By using a.c. fields, these effects are effectively eliminated.

When used in such an application, the spiral windings can be used to generate a spatial sinusoidal field pattern by applying a current to it. The spatial pattern of the field may be controlled by arranging for separate conductors producing sinusoidal fields with different pitches. The spatial phase of the field pattern may be altered by having conductors with different phases and the same pitch, and altering the ratio of currents in each. Normal sine and cos tracks are possible, as are multiple phase tracks. The magnetic Hall effect sensor is then used to measure the magnetic field generated by the spiral windings.

Additionally, the resonant circuit mounted on the movable element can also relay information back to the processing circuit. For example, this information could be temperature or pressure of a fluid in a flow meter. This is achieved by allowing a property of the resonator to vary depending upon the measured quantity. For example, the frequency of a resonator could be made to change with temperature by adding a resistor network containing a thermistor to the resonant circuit. Another possibility is changing the resonant frequency with pressure using, for example, a piezoelectric cell whose capacitance changes with pressure as part of the resonant circuit. Such a property measurement system has the advantage that no electrical connections are required to the measurement device.

We claim:

1. A position detector including:

first and second members mounted for relative movement along a measuring path;

said first member comprising a first circuit having at least two loops arranged in succession along said measuring path, each loop extending along said path and said loops being connected in series and being arranged so that EMFs induced in adjacent said loops by a common background alternating magnetic field oppose each other, and a second circuit extending along said measuring path;

said second member comprising means for interacting with said circuits such that in response to an input driving signal applied to one of said circuits there is induced in the other said circuit an output signal, said interacting means and said at least two loops being arranged so that said output signal continuously varies as a function of their relative position along said path;

characterized in that said interacting means comprises an electromagnetic resonant device arranged so that, in operation, an intermediate signal (Ir) is induced therein by said input driving signal applied to said one circuit and so that said intermediate signal induces said output signal in said other circuit.

2. A position detector according to claim 1, wherein said loops have a generally square shape.

3. A position detector according to claim 1, wherein said loops have a generally diamond shape.

4. A position detector according to claim 1, wherein said loops have a generally hexagonal shape.

5. A position detector according to claim 1, wherein said loops are constituted by opposed sinusoidal convolutions of conductor.

6. A position detector according to claim 1, wherein said first member comprises a plurality of said first circuits which are electrically separate from each other and are located one on the other, and wherein the plurality of loops of the respective first circuits are spatially separated along said path.

7. A position detector according to claim 6, wherein said first member comprises two of said first circuits, and wherein the loops of the respective first circuits are spatially separated along said path by half the extent of each of said loops.

8. A position detector according to claim 6, wherein said first member comprises three of said first circuits, and wherein the loops of the respective first circuits are spatially separated along said path by a third of the extent of each of said loops.

9. A position detector according to claim 6, wherein said first member comprises four of said first circuits, and wherein the loops of the respective first circuits are spatially separated along said path by a quarter of the extent of each of said loops.

10. A position detector according to claim 1, wherein said first circuit comprises more than two of said loops which are arranged in succession along said path.

11. A position detector according to claim 10, further comprising coarse positioning conductor means for identifying within which adjacent two loops of said first circuit said resonant device is located.

12. A position detector according to claim 10 or 11, wherein said first member comprises two of said first circuits, and wherein the extent of each loop forming one of said first circuits is greater than the extent of each loop forming the other of said first circuits.

13. A position detector according to claim 12, wherein said two first circuits are located on but electrically separate from each other.

14. A position detector according to claim 1, further comprising a second electromagnetic resonant device provided separate from and at a fixed distance along said path from the first electromagnetic resonant device, and wherein the spatial separation between the two electromagnetic resonant devices is such that the output signal induced in said other circuit by said first electromagnetic resonant device is in phase quadrature with the output signal induced in the other circuit by said second electromagnetic resonant device.

15. A position detector according to claim 1, comprising a plurality of said electromagnetic resonant devices, each having a different respective resonant frequency and being arranged such that in operation, each electromagnetic resonant device induces an alternating signal at the corresponding resonant frequency in said other circuit whose amplitude varies with its position relative to the loops of said first circuit.

16. A position detector according to claim 1, further comprising a drive means for applying said input driving signal to one of said first and second circuits and processing means for processing the signal induced in said other circuit and for providing an indication therefrom of the relative position of said first and second members.

17. A position detector according to claim 16, wherein said drive means is operable to apply said input drive signal to said second circuit.

18. A position detector according to claim 16, wherein said drive means is operable to apply said input drive signal to said first circuit, and wherein said second circuit comprises at least two loops arranged in succession along said path, each loop extending along said path and being arranged so that EMFs induced in adjacent said loops by a common background alternating magnetic field oppose each other.

19. A position detector according to claim 16, wherein said drive means is operable to apply a pulse of said driving signal during a first time interval and wherein said processing means is operable to process said induced signal during a subsequent second time interval after said first time interval.

20. A position detector according to claim 16, wherein said processing means comprises a demodulator which is matched to the phase of the signal induced in said other circuit by said resonant device.

21. A position detector according to claim 16, wherein said first member comprises two or more of said first circuits, wherein the loops of the respective first circuits are spatially separated along said path and wherein said processing circuit is operable to perform a trigonometric ratio calculation of the signals induced in said two or more first circuits.

22. A position detector according to claim 1, wherein said output signal induced in said other circuit varies sinusoidally as a function of the position along said path of said resonant device relative to said at least two loops, and wherein one period ($T_s$) of said sinusoidal variation corresponds to a relative movement of the extent ($T_s$) of two of said series connected loops.

23. A position detector according to claim 1, wherein said electromagnetic resonant device comprises a coil and a capacitor.

24. A position detector according to claim 1, wherein the loops of said first circuit are carried on a substantially planar surface of said first member.

25. A position detector according to claim 24, wherein said electromagnetic resonant device comprises a coil and a capacitor, and wherein the axis of the coil is generally perpendicular to said planar surface of said first member.

26. A position detector according to claim 25, wherein said first circuit comprises more than two of said loops which are arranged in succession over said path, and wherein said coil comprises a number of similar loops to those of said first circuit, which loops extend over the measurement path and are arranged such that when the resonant device is resonating, the output signal induced in said other circuit represents an average position of said resonant device relative to said first circuit over a number of the loops of said first circuit.

27. A position detector according to claim 25, wherein said resonant device comprises at least two series connected coils separated from one another in said path by a distance which can be varied to reduce the effect of tilt.

28. A position detector according to claim 1, wherein said resonant device comprises a coil (14), a capacitor (17) and a quartz or ceramic type resonator connected in series with said coil and capacitor.

29. A position detector according to claim 1, wherein said first member is fixed and wherein said second member is movable with respect to said first member.

30. A position detector according to claim 29, wherein said first and second circuits lie in substantially the same plane, and wherein said resonant device is movable relative to said first and second circuits in a plane which is substantially parallel to the plane in which said first and second circuits lie.

31. A position detector according to claim 1, wherein said measuring path is linear.

32. A position detector according to claim 1, wherein said measuring path is circular.

33. A position detector according to claim 1, wherein said first and second circuits are carried on a cylindrical surface of said first member.

34. A position detector according to claim 33, wherein said measuring path is linear.

35. A lift comprising a lift and a lift shaft and a position detector according to claim 1 for determining the position of the lift within the lift shaft.

36. A liquid level sensor comprising a float, a support on or in which the float is slidably guided and a position detector according to claim 1 for indicating the relative position of said float and said support.

37. A valve or throttle having a rotary shaft and a position detector according to claim 32 for determining the angular position of the shaft.

38. The valve or throttle of claim 37, wherein the angular travel of said shaft is less than 180°.

39. The valve or throttle of claim 37, wherein the angular travel of the shaft is not more than 120°.

40. A fluid flow meter comprising a tapered tube and a float in the tube that is displaced in a longitudinal position determined by the flow of fluid and a detector according to claim 1 for indicating the relative position of the float and the tube.

41. A fluid flow meter according to claim 40, wherein the float can rotate and carries a plurality of electromagnetic resonant devices, each comprising a coil and a capacitor, and wherein the axis of the coils of the plurality of resonant devices are orthogonal to each other.

42. A fluid flow meter according to claim 41, wherein the float can rotate and wherein two substantially planar first circuits are provided in mutually perpendicular planes.

43. A method of detecting the position of first and second members which are mounted for relative movement along a measuring path, the method comprising the steps of:
providing a first circuit on said first member, the first circuit having at least two loops arranged in succession along said path, each loop extending along said path and said loops being connected in series and being arranged so that EMFs induced in adjacent said loops by a common background alternating magnetic field oppose each other;
providing a second circuit which extends along said measuring path on said first member;
providing an electromagnetic resonant device on said second member for interacting with said circuits such that in response to an input driving signal being applied to one of said circuits, an intermediate signal is induced in said electromagnetic resonant device, which intermediate signal induces in the other circuit an output signal which continuously varies as a function of the position along said path of said resonant device relative to said at least two loops of said first circuit;
applying said driving signal to one of said circuits; and
detecting the signal induced in said other circuit and deriving therefrom the relative positions of said first and second members.

44. A method according to claim 43, wherein said driving signal comprises an alternating signal having a frequency in the range of 10 kHz to 1 MHz.

45. A method according to claim 43, wherein said step of applying said driving signal applies a burst of said driving signal, and wherein said detecting step detects the signals induced in said other circuit after said burst of driving signal has been applied.

46. A position detector including:
first and second members mounted for relative movement along a measuring path;
said first member comprising a first circuit having at least two loops arranged in succession along said measuring path, each loop extending along said path and said loops being connected in series and being arranged so that EMFs induced in adjacent said loops by a common background alternating magnetic field oppose each other, and a second circuit extending along said measuring path;
said second member comprising means for interacting with said circuits such that in response to an input alternating drive signal applied to one of said circuits there is induced in the other said circuit an output alternating signal which varies as a function of the position along said path of said interacting means relative to said at least two loops of said first circuit;
characterized in that said interacting means comprises an electromagnetic harmonic generator arranged so that, in response to said alternating drive signal, an alternating output signal having a frequency different from that of the drive signal is induced in said other circuit.

47. A position detector including:
first and second members mounted for relative movement along a measuring path;
said first member comprising a first circuit having at least two loops arranged in succession along said measuring path, each loop extending along said path and said loops being connected in series and being arranged so that EMFs induced in adjacent said loops by a common background alternating magnetic field oppose each other, and a second circuit extending along said measuring path;
said second member comprising means for interacting with said circuits such that in response to an input driving signal applied to one of said first and second circuits there is induced in the other circuit an output signal which varies as a function of the position along said path of said interacting means relative to said at least two loops of said first circuit;
characterized in that said interacting means comprises an electronic transponder arranged, in operation, to be powered by a magnetic field generated by said input driving signal applied to said one circuit and to induce said output signal in said other circuit, which output signal is distinguishable from the drive signal.

48. A position detector comprising:
a sensing circuit for sensing alternating magnetic fields and having a sensing conductor lying substantially in a plane and extending over a measurement path;
an energizing circuit, different from said sensing circuit, for generating an alternating energizing magnetic field, said energizing circuit having an energizing conductor lying in substantially the same plane as said sensing conductor; and
a resonator electromagnetically coupled to said sensing circuit and said energizing circuit, at least one of the resonator and the sensing circuit being mounted for relative movement with respect to the other over said measurement path;
said resonator being operable, upon energization by said excitation circuit at its resonant frequency, to resonate and to generate an alternating magnetic field which is substantially 90° out of phase with said energizing magnetic field, which resonator magnetic field induces an alternating signal in said sensing circuit which is similarly substantially 90° out of phase with any signal induced in said sensing circuit by said energizing magnetic field;

said resonator and said sensing circuit being arranged so that the amount of electromagnetic coupling therebetween sinusoidally varies as a function of their relative positions, thereby causing the amplitude of said signal induced in said sensing circuit by said resonator magnetic field to vary in a similar sinusoidal manner as a function of the position of the resonator relative to the sensing circuit.

49. A position detector comprising:

a sensor comprising first and second sensing circuits, each extending over a measurement path, said circuits being offset from each other in the measurement path and being operable for sensing alternating magnetic fields;

an energizing circuit, different from said sensing circuits, for generating an energizing alternating magnetic field;

a resonator which is electromagnetically coupled to said sensing circuits and said energizing circuit;

at least one of said sensor and said resonator being mounted for relative movement with respect to the other over said measurement path;

said resonator being operable, upon energization by said energizing circuit, to resonate and to generate an alternating magnetic field which induces an alternating signal in each of said sensing circuits;

said resonator and said sensing circuits being arranged so that the amount of electromagnetic coupling therebetween varies sinusoidally as a function of their relative positions, thereby causing the amplitude of said signal induced in each of said sensing circuits by said resonator magnetic field to vary in a similar sinusoidal manner as a function of the position of the resonator relative to the corresponding sensing circuit;

the amplitude of the signal induced in the first sensing circuit by the magnetic field generated by the resonator being different from the amplitude of the signal induced in the second sensing circuit by the magnetic field generated by the resonator, for a given relative position between the resonator and the sensor, due to the offset between the sensing circuits in the measurement path; and processing circuit connected to process and to demodulate the alternating signal induced in said first and second sensing circuits by the magnetic field generated by said resonator and to provide a trigonometric ratio of the demodulated signals from the respective first and second sensing circuits, which ratio is indicative of the relative position of said resonator and said first and second sensing circuits.

50. A position detector comprising:

a sensing circuit extending over a measurement path for sensing alternating magnetic field oriented in a predetermined direction;

an energizing circuit, different from said sensing circuit, for generating an energizing alternating magnetic field; and a resonator electromagnetically coupled to said sensing circuit and said energizing circuit;

at least one of the resonator and the sensing circuit being mounted for relative movement with respect to the other over said measurement path in a plane that is substantially perpendicular to said predetermined direction;

said resonator being operable, upon energization by said energizing circuit, to resonate and to generate an alternating magnetic field whose magnetic axis lies substantially in said predetermined direction, which resonator magnetic field induces an alternating signal in said sensing circuit;

said resonator and said sensing circuit being arranged so that the amount of electromagnetic coupling therebetween varies sinusoidally as a function of their relative positions, thereby causing the amplitude of said signal induced in said sensing circuit by said resonator magnetic field to vary in a similar sinusoidal manner as a function of the position of the resonator relative to the sensing circuit.

51. A position detector comprising:

a sensing circuit for sensing alternating magnetic fields, said sensing circuit comprising a plurality of series connected conductive loops which extend successively over a measurement path and which are connected to each other so that any EMF induced in one of said loops by an alternating magnetic field is opposed by the EMF induced in an adjacent connected loop by the same magnetic field;

an energizing circuit, different from said sensing circuit, for generating an energizing alternating magnetic field; and a resonator which is electromagnetically coupled to said sensing circuit and said energizing circuit;

at least one of the resonator and the sensing circuit being mounted for relative movement with respect to the other over said measurement path;

said resonator being operable, upon energization by said energizing circuit, to resonate and to generate an alternating magnetic field which induces an alternating signal in said sensing circuit;

said resonator and said sensing circuit being arranged so that the amount of electromagnetic coupling therebetween varies sinusoidally as a function of their relative positions, the period of said sinusoidal variation corresponding to the extent, over said measurement path, of two of said series connected loops, thereby causing the amplitude of said signal induced in said sensing circuit by said resonator magnetic field to vary in a similar sinusoidal manner as a function of the position of the resonator relative to said sensing circuit;

said resonator including a conductor having a number of loops similar to those of the sensing circuit, which loops extend along the measurement path and are arranged such that when the resonator is resonating, the signal induced in said sensing circuit represents an average position of said resonator relative to said sensing circuit over a number of said sensing circuit loops.

52. A position detector comprising:

a sensing circuit for sensing alternating magnetic fields and having a sensing conductor lying substantially in a plane and extending over a measurement path;

an energizing circuit, different from said sensing circuit, for generating an energizing alternating magnetic field;

said energizing circuit having an energizing conductor which lies in a plane which is substantially parallel to the plane in which said sensing conductor lies and being operable to provide a pulse of said energizing alternating magnetic field during a first time interval;

a self-contained electromagnetic device, electromagnetically coupled to said sensing circuit and said energizing circuit;

at least one of the sensing circuit and the self-contained electromagnetic device being mounted for relative movement with respect to the other over said measurement path in a plane which is substantially parallel to the plane in which said sensing conductor lies;

said self-contained electromagnetic device being operable, upon energization by energizing circuit, to generate an alternating magnetic field which is such as to induce an alternating signal in said sensing circuit;

said self-contained electromagnetic device and said sensing circuit being arranged so that the magnetic coupling therebetween continuously varies as a function of their relative positions, thereby causing the amplitude of said induced signal to continuously vary with the position of the self-contained electromagnetic device relative to the sensing circuit; and processing circuitry operable to process, during a subsequent second time interval after said first time interval, the signal induced in said sensing circuit by said self-contained electromagnetic device and to provide the relative positions of said sensing circuit and electromagnetic device.

53. A position detector comprising:

a sensing circuit for sensing alternating magnetic fields;

an energizing circuit, different from said sensing circuit, for generating an energizing alternating magnetic field;

at least one of said sensing circuit and said energizing circuit comprising a plurality of series connected conductive loops which extend successively over a measurement path and which are connected to each other so that any EMF induced in one of said loops by an alternating magnetic field is opposed by the EMF induced in an adjacent connected loop by the same magnetic field; and a harmonic generator electromagnetically coupled to said sensing circuit and said energizing circuit;

said harmonic generator and said at least one of said sensing circuit and said energizing circuit being relatively movable over said measurement path;

said harmonic generator being operable, upon energization by said energizing circuit, to generate an alternating magnetic field which is such as to induce harmonic signals in said sensing circuit;

said harmonic generator and said sensing circuit being arranged so that the electromagnetic coupling therebetween varies sinusoidally as a function of their relative positions, the period of said sinusoidal variation corresponding to the extent, over said measurement path, of two of said series connected loops, thereby causing the amplitude of said induced harmonic signals to vary sinusoidally with the position of said harmonic generator relative to said sensing circuit.

* * * * *

UNITED STATES PATENT AND TRADEMARK OFFICE
CERTIFICATE OF CORRECTION

PATENT NO. : 5,815,091
DATED : September 29, 1998
INVENTOR(S) : DAMES et al

It is certified that error appears in the above-identified patent and that said Letters Patent is hereby corrected as shown below:

Column 31, line 18, after "provide", insert --an indication of--.

Signed and Sealed this

Seventeenth Day of August, 1999

Attest:

Q. TODD DICKINSON

Attesting Officer

Acting Commissioner of Patents and Trademarks